(12) United States Patent
Grossman et al.

(10) Patent No.: US 10,180,776 B2
(45) Date of Patent: Jan. 15, 2019

(54) IMAGE GROUPING WITH AUDIO COMMENTARIES SYSTEM AND METHOD

(71) Applicants: Andrew Grossman, Hopkins, MN (US); Kenneth F. Krutsch, Minnetonka, MN (US)

(72) Inventors: Andrew Grossman, Hopkins, MN (US); Kenneth F. Krutsch, Minnetonka, MN (US)

(73) Assignee: Ambient Consulting, LLC, Minnetonka, MN (US)

( * ) Notice: Subject to any disclaimer, the term of this patent is extended or adjusted under 35 U.S.C. 154(b) by 220 days.

(21) Appl. No.: 15/181,529

(22) Filed: Jun. 14, 2016

(65) Prior Publication Data

US 2016/0291824 A1 Oct. 6, 2016

Related U.S. Application Data

(63) Continuation-in-part of application No. 14/043,385, filed on Oct. 1, 2013, now Pat. No. 9,894,022.

(51) Int. Cl.

| | |
|---|---|
| *G06F 15/16* | (2006.01) |
| *G06F 3/0484* | (2013.01) |
| *G06Q 30/06* | (2012.01) |
| *G06Q 50/16* | (2012.01) |
| *H04L 12/58* | (2006.01) |

(Continued)

(52) U.S. Cl.
CPC .......... *G06F 3/0484* (2013.01); *G06Q 10/10* (2013.01); *G06Q 30/0643* (2013.01); *G06Q 50/16* (2013.01); *H04L 51/066* (2013.01); *H04L 51/10* (2013.01); *H04N 21/2743* (2013.01); *G10L 25/57* (2013.01); *H04L 51/04* (2013.01); *H04L 51/38* (2013.01)

(58) Field of Classification Search
CPC ......... H04N 21/2743; H04N 21/42203; H04N 21/4756; H04N 21/4852; H04N 21/8106; H04N 21/4316; H04N 21/8547; G06Q 10/10; G06Q 10/00; G06Q 50/16
USPC .......................... 709/206; 715/716; 707/722
See application file for complete search history.

(56) References Cited

U.S. PATENT DOCUMENTS 7,987,492 B2 7/2011 Liwerant et al.
8,199,188 B2 6/2012 Amling et al.
(Continued)

OTHER PUBLICATIONS

Jan. 13, 2017 USPTO Office Action (U.S. Appl. No. 14/227,032)—Our Matter 5100.
(Continued)

*Primary Examiner* — Kyung H Shin
(74) *Attorney, Agent, or Firm* — Tysver Beck Evans, PLLC

(57) ABSTRACT

A system and method are presented to allow audio communication between users concerning a group of images. A first mobile device has an app that selects a plurality of images and then records audio commentary for the plurality of images. The images and audio commentary are grouped into an image grouping, and the image grouping is transmitted to a second mobile device. Reply commentaries to the image grouping can also be associated with a particular image in the grouping. Image groupings can be presented by reviewing all commentaries on a single image first before moving to a second image, or by reviewing all commentaries made in a user-session before moving to a second user session.

13 Claims, 14 Drawing Sheets

(51) Int. Cl.
*H04N 21/2743* (2011.01)
*G06Q 10/10* (2012.01)
*G10L 25/57* (2013.01)

(56) References Cited

U.S. PATENT DOCUMENTS

| | | | |
|---|---|---|---|
| 8,225,335 | B2 | 7/2012 | Glenner et al. |
| 8,606,297 | B1 | 12/2013 | Simkhai et al. |
| 8,701,020 | B1 | 4/2014 | Fulcher et al. |
| 9,031,963 | B2 | 5/2015 | Anand et al. |
| 9,042,923 | B1 | 5/2015 | Mirho |
| 2004/0199922 | A1 | 10/2004 | Krutsch et al. |
| 2004/0267387 | A1 | 12/2004 | Samadani |
| 2005/0008343 | A1 | 1/2005 | Frohlich et al. |
| 2005/0108233 | A1 | 5/2005 | Metsatahti et al. |
| 2005/0216568 | A1 | 9/2005 | Walkush |
| 2006/0041848 | A1 | 2/2006 | Lira |
| 2006/0148500 | A1 | 7/2006 | Glenner et al. |
| 2008/0028023 | A1 | 1/2008 | Locke |
| 2008/0146254 | A1 | 6/2008 | Groeger |
| 2009/0225788 | A1 | 9/2009 | Kephart et al. |
| 2009/0254459 | A1 | 10/2009 | Williams et al. |
| 2010/0262618 | A1 | 10/2010 | Hedinsson et al. |
| 2011/0087749 | A1 | 4/2011 | Swink et al. |
| 2011/0087972 | A1 | 4/2011 | Swink et al. |
| 2011/0131610 | A1 | 6/2011 | Lee et al. |
| 2011/0264532 | A1 | 10/2011 | Chan |
| 2012/0066594 | A1* | 3/2012 | Gavade ............. H04N 21/2743 715/716 |
| 2012/0150698 | A1 | 6/2012 | Mcclements, IV |
| 2012/0151320 | A1 | 6/2012 | Mcclements, IV |
| 2012/0157134 | A1 | 6/2012 | Lee et al. |
| 2012/0179978 | A1 | 7/2012 | Klassen |
| 2012/0189282 | A1 | 7/2012 | Wyatt et al. |
| 2012/0254156 | A1* | 10/2012 | Rao ........................ G06Q 10/10 707/722 |
| 2012/0284426 | A1 | 11/2012 | Smith et al. |
| 2012/0290907 | A1 | 11/2012 | Smith et al. |
| 2012/0317499 | A1 | 12/2012 | Shen |
| 2012/0321271 | A1 | 12/2012 | Baldwin et al. |
| 2013/0013699 | A1 | 1/2013 | Huxley |
| 2013/0022330 | A1 | 1/2013 | Carter et al. |
| 2013/0091205 | A1 | 4/2013 | Kotler et al. |
| 2013/0173531 | A1 | 7/2013 | Rinearson et al. |
| 2013/0178961 | A1 | 7/2013 | Ly et al. |
| 2013/0263002 | A1 | 10/2013 | Park |
| 2013/0283144 | A1 | 10/2013 | Roh et al. |
| 2014/0063174 | A1 | 3/2014 | Junuzovic et al. |
| 2014/0073298 | A1 | 3/2014 | Rossmann |
| 2014/0089415 | A1 | 3/2014 | Huang et al. |
| 2014/0146177 | A1 | 5/2014 | Pacor et al. |
| 2014/0150042 | A1 | 5/2014 | Pacor et al. |
| 2014/0163980 | A1 | 6/2014 | Tesch et al. |
| 2014/0164927 | A1 | 6/2014 | Salaverry et al. |
| 2014/0344712 | A1 | 11/2014 | Okazawa et al. |
| 2014/0348394 | A1 | 11/2014 | Salaverry et al. |
| 2015/0039706 | A1 | 2/2015 | Zilmer et al. |
| 2015/0095433 | A1 | 4/2015 | Grossman et al. |
| 2015/0281243 | A1 | 10/2015 | Das |
| 2015/0282115 | A1 | 10/2015 | Pitt et al. |
| 2015/0282282 | A1 | 10/2015 | Breuer et al. |
| 2016/0006781 | A1 | 1/2016 | Glenner et al. |
| 2016/0100149 | A1 | 4/2016 | Sharma et al. |

OTHER PUBLICATIONS

Aug. 11, 2017 USPTO Office Action (U.S. Appl. No. 14/542,599)—Our Matter 5193.
Nov. 28, 2016 USPTO Office Action (U.S. Appl. No. 14/542,599)—Our Matter 5193.
Feb. 6, 2017 USPTO Office Action (U.S. Appl. No. 14/179,602)—Our Matter 5085.
Oct. 7, 2015 USPTO Office Action (U.S. Appl. No. 14/521,576)—Our Matter 5184.
Feb. 16, 2016 USPTO Office Action (U.S. Appl. No. 14/227,032)—Our Matter 5100.
Apr. 14, 2016 PCT Preliminary Examination Report (Serial No. PCT/US2014/058523)—Our Matter 5194.
Apr. 14, 2016 PCT Preliminary Examination Report (Serial No. PCT/US2014/058588)—Our Matter 5196.
May 4, 2016 USPTO Office Action (U.S. Appl. No. 14/179,602)—Our Matter 5085.
Jun. 7, 2016 USPTO Office Action (U.S. Appl. No. 14/043,385)—Our Matter 5069.
Sep. 2, 2015 USPTO Office Action (U.S. Appl. No. 14/043,385)—Our Matter 5069.

* cited by examiner

US 10,180,776 B2

IMAGE GROUPING WITH AUDIO COMMENTARIES SYSTEM AND METHOD

RELATED APPLICATION

This application is a continuation-in-part to U.S. patent application Ser. No. 14/043,385, filed on Oct. 1, 2013, which is hereby incorporated by reference in its entirety. This application is also related to the content found in U.S. patent application Ser. No. 14/542,599 (filed on Nov. 15, 2014); U.S. patent application Ser. No. 14/521,576 (filed on Oct. 23, 2014); U.S. patent application Ser. No. 14/227,032, (filed on Mar. 27, 2014); and U.S. patent application Ser. No. 14/179,602, (filed on Feb. 23, 2014); all of which are hereby incorporated by reference in their entireties.

FIELD OF THE INVENTION

The present application relates to the field of image-centered communication between users. More particularly, the described embodiments relate to a system and method for bi-directional communications centered on a plurality of still images with audio commentaries gathered into an image grouping.

SUMMARY

One embodiment of the present invention provides audio communication between users concerning an image. The originator of the communication uses an app operating on a mobile device to create or select a photograph or other image. The same app is then used to attach an audio commentary to the image. The app encodes the audio commentary and the image together into a video file that can be viewed by video players included with modern mobile devices. This video file is one example of an "audio image" file used by the present invention.

The originator can then select one or more recipients to receive the video file. Recipients are identified by e-mail addresses, cell phone numbers, or user identifiers used by a proprietary communication system. The app analyzes each recipient address to determine the preferred mode of delivery for the video file. If the recipient also uses the app, the file is delivered through the proprietary communication system and received by the app on the recipient's mobile device. Otherwise, the file is delivered through MMS (if the recipient is identified by a telephone number) or through e-mail (if the recipient is identified by an e-mail address). Regardless of how the file is sent, a message containing the file and the particulars of the transmission are sent to the server managing the proprietary communication system.

When the file is sent through MMS or e-mail, it is accompanied by a link that allows the recipient to download an app to their mobile device to continue the dialog with the originator. When the link is followed, the user can download the app. Part of the set-up process for the app requires that new users identify their e-mail address and cell phone. This set-up information is communicated to the proprietary server, which can then identify audio image messages that were previously sent to the recipient through either e-mail or MMS message. Those audio image messages are then presented through an in-box in the app, where they can be selected for downloading and presentation to the newly enrolled user.

All recipients of the audio image file can play the file in order to view the image and hear the originator's audio commentary. Recipients using the app on their mobile devices can record a reply audio commentary. This reply audio is then encoded by the app into a new video file, where the reply audio is added to the beginning of the previous audio track and the video track remains a static presentation of the originally selected image. This new video file can be returned to the originator, allowing the originator to create a new response to the reply audio.

In addition, a group of images can be selected for inclusion in a single image grouping. The sender selects the images, and then indicates the order in which the images should be presented. The user starts to record the audio commentary while viewing the first image, and then provides input to the mobile device when to switch to the next image. The timed-transitions between grouped images can be recorded into a video file by the sending device, or be recorded as metadata for translation by the app on the recipient's device. Alternatively, the user can record audio commentaries for each of the images separately. In this alternative embodiment, each image is associated with its own audio commentary and any reply commentaries made to the image. The images are grouped together in a single image grouping via metadata. When displayed, user can select whether they wish to listen to the commentaries of the message groupings. Users can choose to view all of the commentaries relating to a single image first before moving to the next image, or view all of the commentaries from a particular user session across multiple images before viewing the commentaries from a later user session.

DETAILED DESCRIPTION

System 100

Figure 1:
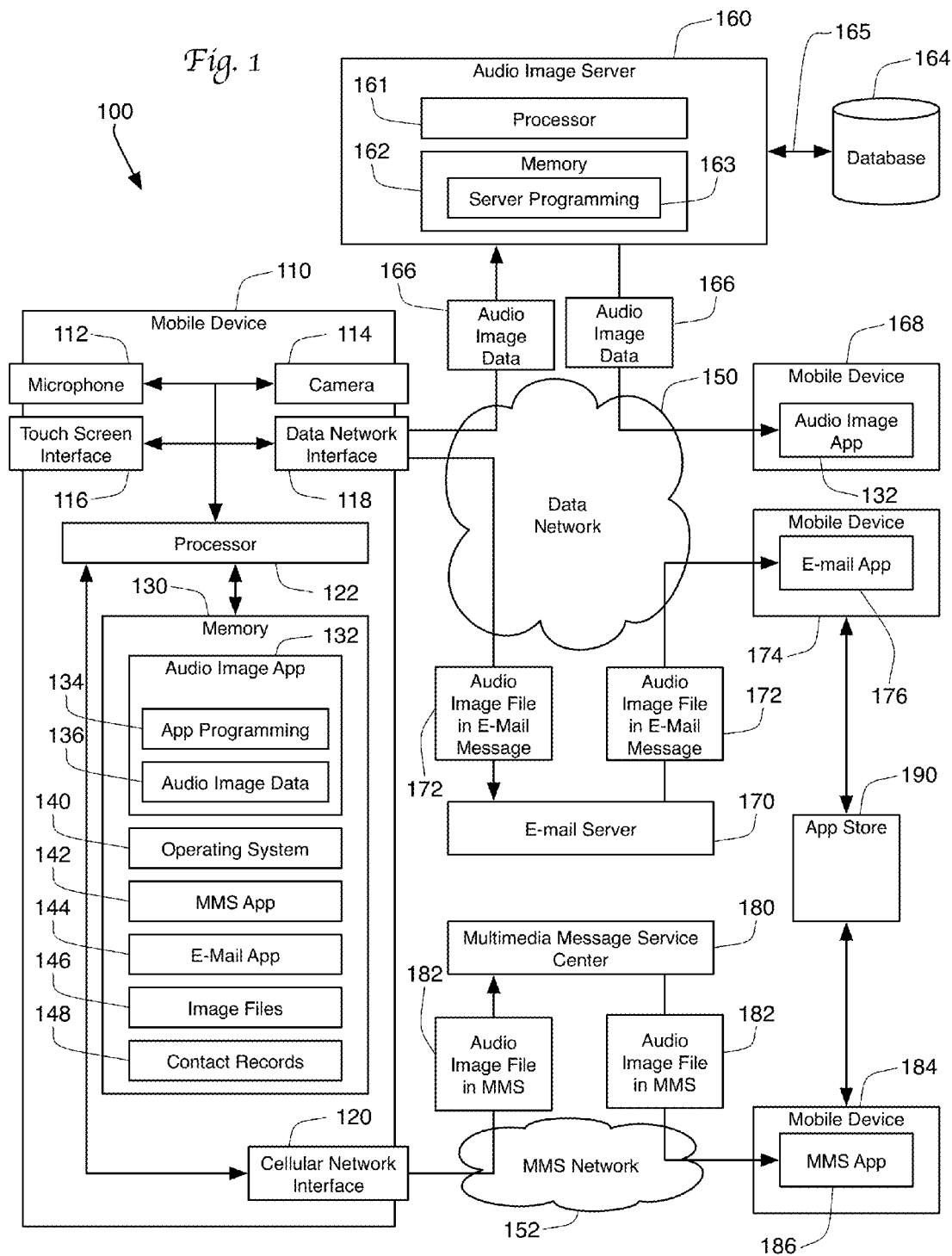
FIG. 1 is a schematic view of a system utilizing the present invention.

FIG. 1 shows a system 100 in which a mobile device 110 can create and transmit audio image files to other users. Audio image files allow users to have a bi-directional, queued, audio communication about a particular visual image or presentation. The mobile device 110 can communicate over a wide area data network 150 with a plurality of computing devices. In FIG. 1, the mobile device 110 communicates over network 150 with an audio image server 160 to send an audio image to mobile device 168, and communicates over the same network 150 with an e-mail server 170 in order to send an e-mail containing an audio image to a second mobile device 174. In one embodiment, the wide area data network is the Internet. The mobile device 110 is also able to communicate with a multimedia messaging service center ("MMS center") 180 over MMS network 152 in order to send an audio image within an MMS message to a third mobile device 184.

The mobile device 110 can take the form of a smart phone or tablet computer. As such, the device 110 will include a microphone 112 and a camera 114 for receiving audio and visual inputs. The device 110 also includes a touch screen user interface 116. In the preferred embodiment, touch screen 116 both presents visual information to the user over the display portion of the touch screen 116 and also receives touch input from the user.

The mobile device 110 communicates over the data network 150 through a data network interface 118. In one embodiment, the data network interface 118 connects the device 110 to a local wireless network that provides connection to the wide area data network 150. The data network interface 118 preferably connects via one of the Institute of Electrical and Electronics Engineers' (IEEE) 802.11 standards. In one embodiment, the local network is based on TCP/IP, and the data network interface 118 utilizes a TCP/IP protocol stack.

Similarly, the mobile device 110 communicates over the MMS network 152 via a cellular network interface 120. In the preferred embodiment, the mobile device 110 sends multi-media messaging service ("MMS") messages via the standards provided by a cellular network 152, meaning that the MMS network 152 used for data messages is the same network 152 that is used by the mobile device 110 to make cellular voice calls. In some embodiments, the provider of the cellular data network also provides an interface to the wide area data network 150, meaning that the MMS or cellular network 152 could be utilized to send e-mail and proprietary messages as well as MMS messages. This means that the actual physical network interface 118, 120 used by the mobile device 110 is relatively unimportant. Consequently, the following description will focus on three types of messaging: e-mail, MMS, and proprietary messaging, without necessarily limiting these messages to a particular network 150, 152 or network interface 118, 120. The use of particular interfaces 118, 120 and networks 150, 152 in this description is merely exemplary.

The mobile device 110 also includes a processor 122 and a memory 130. The processor 120 can be a general purpose CPU, such as those provided by Intel Corporation (Mountain View, Calif.) or Advanced Micro Devices, Inc. (Sunnyvale, Calif.), or a mobile specific processor, such as those designed by ARM Holdings (Cambridge, UK). Mobile devices such as device 110 generally use specific operating systems 140 designed for such devices, such as iOS from Apple Inc. (Cupertino, Calif.) or ANDROID OS from Google Inc. (Menlo Park, Calif.). The operating system 140 is stored on memory 130 and is used by the processor 120 to provide a user interface for the touch screen display 116, handle communications for the device 110, and to manage and provide services to applications (or apps) that are stored in the memory 130. In particular, the mobile device 100 is shown with an audio image app 132, MMS app 142, and an e-mail app 144. The MMS app 142 is responsible for sending, receiving, and managing MMS messages over the MMS network 152. Incoming messages are received from the MMS center 180, which temporarily stores incoming messages until the mobile device 110 is able to receive them. Similarly, the e-mail app 144 sends, receives, and manages e-mail messages with the aid of one or more e-mail servers 170.

The audio image app 132 is responsible for the creation of audio image files, the management of multiple audio image files, and the sending and receiving of audio image files. In one embodiment, the audio image app 132 contains programming instructions 134 for the processor 122 as well as audio image data 136. The image data 136 will include all of the undeleted audio image files that were created and received by the audio image app 132. In the preferred embodiment, the user is able to delete old audio image files that are no longer desired in order to save space in memory 130.

The app programming 134 instructs the processor 122 how to create audio image files. The first step in so doing is either the creation of a new image file using camera 114, or the selection of an existing image file 146 accessible by the mobile device 110. The existing image file 146 may be retrieved from the memory 130 of the mobile device 110, or from a remote data storage service (not shown in FIG. 1) accessible over data network 150. The processor 122 then uses the display 116 to show the image to the user, and allows the user to input an audio commentary using the microphone 112. The app programming 134 instructs the processor 122 how to combine the recorded audio data with the image into an audio image file. In some embodiments, the audio-image file will take the form of a standard video file. In the preferred embodiment, the app programming 134 takes advantage of the ability to link to existing routines in the operating system 140 in order to render this video file. In most cases, these tools take the form of a software development kit (or "SDK") or access to an application programming interface (or "API"). For example, Apple's iOS gives third-party apps access to an SDK to render videos using the H.264 video codec.

After the app programming 134 causes the processor 122 to create the video file (one type of an audio image file), the app programming 134 causes the processor 122 to present a user input screen on display 116 that allows the user to select a recipient of the audio image file. In one embodiment, the user is allowed to select recipients from existing contact records 148 that already exist on the mobile device 110. These same contact records may be used by the MMS app 142 to send MMS messages and the E-mail app 144 to send e-mail messages. In one embodiment, when the user selects a contact as a recipient, the app programming 134 identifies either an e-mail address or a cell phone number for the recipient.

Once the recipient is identified, the app 132 determines whether the audio image file should be sent to the recipient using the audio image server 160 and its proprietary communications channel, or should be sent via e-mail or MMS message. This determination may be based on whether or not the recipient mobile device is utilizing the audio image app 132. A mobile device is considered to be using the audio image app 132 if the app 132 is installed on the device and the user has registered themselves as a user of the app 132 with the audio image server 160. In FIG. 1, mobile device 168 is using the audio image app 132, while mobile devices 174 and 184 are not using the app 132.

To make this determination, the app programming 134 instructs the processor 122 to send a user verification request containing a recipient identifier (such the recipient's e-mail address or cell phone of the recipient, either of which could be considered the recipient's "audio image address") to the audio image server 160. The server 160 is a programmed computing device operating a processor 161 under control of server programming 163 that is stored on the memory 162 of the audio image server 160. The processor 161 is preferably a general purpose CPU of the type provided by Intel Corporation or Advanced Micro Devices, Inc., operating under the control of a general purpose operating system such as Mac OS by Apple, Inc., Windows by Microsoft Corporation (Redmond, Wash.), or Linux (available from a variety of sources under open source licensing restrictions). The server 160 is in further communication with a database 164 that contains information on audio image users, the audio image addresses of the users, and audio image files. The server 160 responds to the user verification request by consulting the database 164 to determine whether each recipient's audio image address is associated in the database 164 with a known user of the app 132. The server 160 then informs the mobile device 110 of its findings.

Although the server 160 is described above as a single computer with a single processor 161, it would be straightforward to implement server 160 as a plurality of separate physical computers operating under common or cooperative programming. Consequently, the terms server, server computer, or server computers should all be viewed as covering situations utilizing one or more than one physical computer.

If the server 160 indicates that the recipient device 168 is associated with a known user of the app 132, then, in one embodiment, the audio image file 166 is transmitted to that mobile device 168 via the server 160. To do so, the mobile device 110 transmits to the server 160 the audio image video file along with metadata that identifies the sender and recipient of the file 166. The server 160 stores this information in database 164, and informs the recipient mobile device 168 that it has received an audio image file 166. If the device 168 is powered on and connected to the data network 150, the audio image file 166 can be immediately transmitted to the mobile device 168, where it is received and managed by the audio image app 132 on that device 168. The audio image app 132 would then inform its user that the audio image file is available for viewing. In the preferred embodiment, the app 132 would list all received audio image files in a queue for selection by the user. When one of the files is selected, the app 132 would present the image and play the most recently added audio commentary made about that image. The app 132 would also give the user of device 168 the ability to record a reply commentary to the image, and then send that reply back to mobile device 110 in the form of a new audio image file. The new audio image file containing the reply comment could also be forwarded to third parties.

If the server 160 indicates that the recipient device 174 or 184 is not associated with a user of the audio image app 132, the mobile device 110 will send the audio image file without using the proprietary communication system provided by the audio image server 160. If the audio image address is an e-mail address, the audio image app 132 on device 110 will create an e-mail message 172 to that address. This e-mail message 172 will contain the audio image file as an attachment, and will be sent to an e-mail server 170 that receives e-mail for the e-mail address used by device 174. This server 170 would then communicate to the device 174 that an e-mail has been received. If the device 174 is powered on and connected to the data network 150, an e-mail app 176 on the mobile device 174 will receive and handle the audio image file within the received e-mail message 172.

Similarly, if the audio image address is a cell phone number, the audio image app 132 will create an MMS message 182 for transmission through the cellular network interface 120. This MMS message 182 will include the audio image file, and will be delivered to an MMS center 180 that receives MMS messages for mobile device 184. If the mobile device 184 is powered on and connected to the MMS network 152, an MMS app 186 on mobile device 184 will download and manage the MMS message 182 containing the audio image file 182. Because the audio image file in either the e-mail message 172 and the MMS message 182 is a standard video file, both mobile devices 174 and 184 can play the file using standard programming that already exists on the devices 174, 184. This will allow the devices 174, 184 to display the image and play the audio commentary concerning the image as input by the user of device 110 without requiring the presence of the audio image app 132. However, without the presence of the app 132, it would not be possible for either device 174, 184 to easily compose a reply audio image message that could be sent back to device 110.

In the preferred embodiment, the e-mail message 172 and the MMS message 182 both contain links to location 190 where the recipient mobile devices 174, 184 can access and download the audio image app 132. The message will also communicate that downloading the app 132 at the link will allow the recipient to create and return an audio reply to this audio image file. The linked-to download location 190 may be an "app store", such as Apple's App Store for iOS devices or Google's Play Store for Android devices. The user of either device 174, 184 can use the provided link to easily download the audio image app 132 from the app store 190. When the downloaded app 132 is initially opened, the users are given the opportunity to register themselves by providing their name, e-mail address(es) and cell phone number(s) to the app 132. The app 132 then shares this information with the audio image server 160, which creates a new user record in database 164. The server 160 can then identify audio image messages that were previously sent to that user and forward those messages to the user. At this point, the user can review the audio image files using the app 132, and now has the ability to create and send a reply audio message as a new audio image file.

In some embodiments, the audio image file is delivered as a video file to e-mail recipients and MMS recipients, but is delivered as separate data elements to mobile devices 168 that utilize the audio image app 132. In other words, a single video file is delivered via an e-mail or MMS attachment, while separate data elements are delivered to the mobile devices 168 that use the audio image app 132. In these cases, the "audio image file" delivered to the mobile device 168 would include an image file compressed using a still-image codec (such as JPG, PNG, or GIF), one or more audio files compressed using an audio codec (such as MP3 or AAC), and metadata identifying the creator, creation time, and duration of each of the audio files. The audio image app 132 would then be responsible for presenting these separate data elements as a unified whole. As explained below, the audio image file 166 may further include a plurality of still images, one or more video segments, metadata identifying the order and timing of presentations of the different visual elements, or metadata defining augmentations that may be made during the presentation of the audio image file.

In sending the MMS message 182, the mobile device 130 may take advantage of the capabilities of the separate MMS app 144 residing on the mobile device 110. Such capabilities could be accessed through an API or SDK provided by the app 144, which is described in more detail below. Alternatively, the audio image app programming 134 could contain all of the programming necessary to send the MMS message 182 without requiring the presence of a dedicated MMS app 142. Similarly, the mobile device 130 could use the capabilities of a separate e-mail app 144 to handle the transmission of the e-mail message 172 to mobile device 174, or could incorporate the necessary SMTP programming into the programming 134 of the audio image app 132 itself.

Database 164

Figure 2:
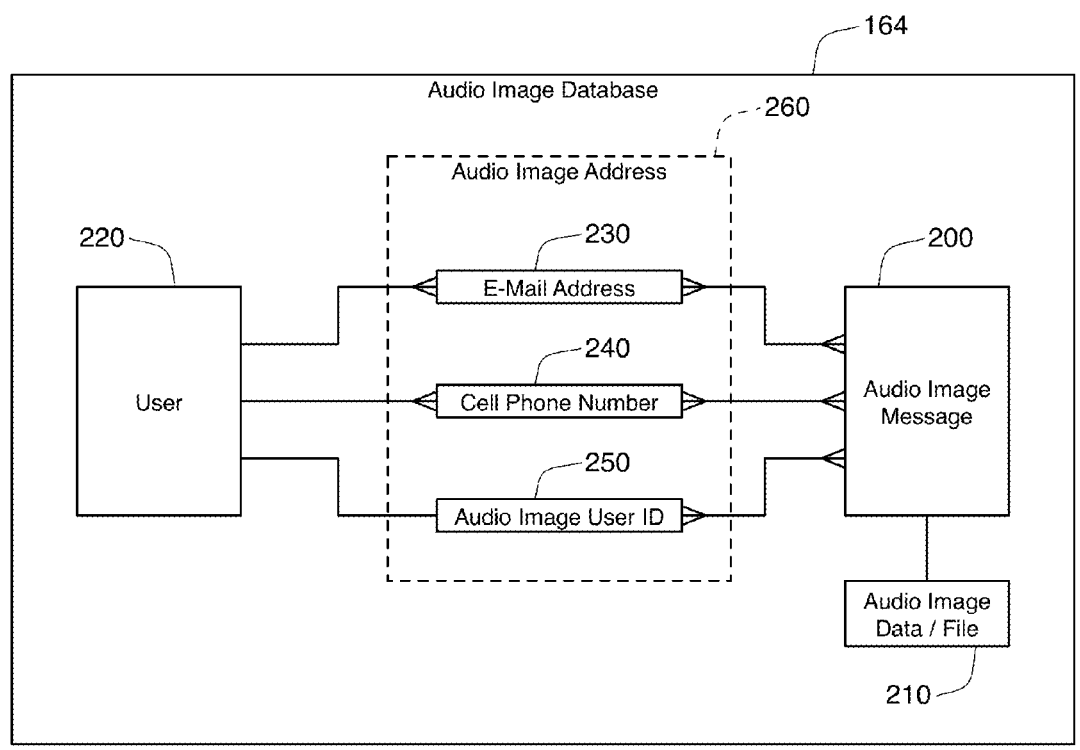
FIG. 2 is a schematic diagram showing a database accessed by a server used in the system of FIG. 1.

FIG. 2 shows one embodiment of database 164 that is used to track users and audio image messages. The database 164 may be stored in the memory 162 of the audio image server 160, or it may be stored in external memory accessible to the server 160 through a bus or network 165. The database 164 is preferably organized as structured data, such as separate tables in a relational database or as database objects in an object-oriented database environment. Database programming 163 stored on the memory 162 of the audio image server 160 directs the processor 161 to access, manipulate, update, and report on the data in the database 164. FIG. 2 shows the database 164 with tables or objects for audio image messages 200, audio image data or files 210, users 220, e-mail addresses 230, cell phone numbers 240, and audio image user IDs 250. Since e-mail addresses 230, cell phone numbers 240, and audio image user IDs 250 can all be used as a recipient or sender address for an audio image message 200, FIG. 2 shows a dotted box 260 around these database entities 230, 240, 250 so that this description can refer to any of these address types as an audio image address 260. These addresses 260 can all be considered electronic delivery addresses, as the addresses 260 each can be used to deliver an electronic communication to a destination.

Relationships between the database entities are represented in FIG. 2 using crow's foot notation. For example, FIG. 2 shows that each user database entity 220 can be associated with a plurality of e-mail address 230 and cell phone numbers 240, but with only a single audio image user ID 250. Meanwhile, each e-mail address 230, cell phone number 240, and audio image user ID 250 (i.e., each audio image address 260) is associated with only a single user entity 220. Similarly, each audio image message 200 can be associated with a plurality of audio image addresses 260 (e-mail addresses 230, cell phone numbers 240, and audio image user IDs 250), which implies that a single message 200 can have multiple recipients. In the preferred embodiment, the audio image message 200 is also associated with a single audio image address 260 to indicate the sender of the audio image message 200. The fact that each audio image address 260 can be associated with multiple audio image messages 200 indicates that a single audio image address 260 can be the recipient or sender for multiple messages 200. FIG. 2 also shows that each audio image message database entity 200 is associated directly with an audio image file 210. This audio image file 210 can be a single video file created by the audio image app 132, or can be separate image and audio files along with metadata describing these files. The distinctions between these database entities 200-250 are exemplary and do not need to be maintained to implement the present invention. For example, it would be possible for the audio image message 200 to incorporate the audio image data or files 210 in a single database entity. Similarly, each of the audio image addresses 260 could be structured as part of the user database entity 220. The separate entities shown in FIG. 2 are presented to assist in understanding the data that is maintained in database 164 and the relationships between that data.

Associations or relationships between the database entities shown in FIG. 2 can be implemented through a variety of known database techniques, such as through the use of foreign key fields and associative tables in a relational database model. In FIG. 2, associations are shown directly between two database entities, but entities can also be associated through a third database entity. For example, a user database entity 200 is directly associated with one or more audio image addresses 260, and through that relationship the user entity 200 is also associated with audio image messages 200. These relationships can also be used to indicate different roles. For instance, an audio image message 200 may be related to two different audio image user IDs 250, one in the role of a recipient and one in the role as the sender.

Audio Image File 300

Figure 3:
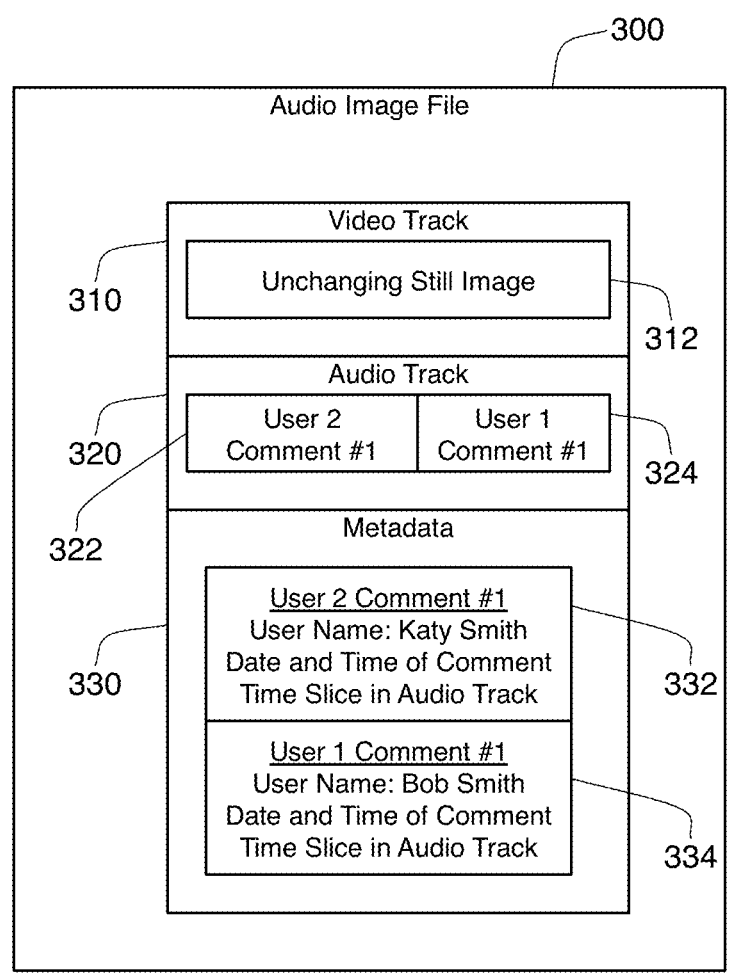
FIG. 3 is a schematic diagram showing the components of an audio image file.

An example audio image file 300 is shown in FIG. 3. In this example, the audio image file 300 is a video file containing a video track 310, an audio track 320, and metadata 330. The video track contains a single, unchanging still image 312 that is compressed using a known video codec. When the H.264 codec is used, for example, the applicable compression algorithms will ensure that the size of the video track 310 will not increase proportionally with the length of the audio track, as an unchanging video track is greatly compressed using this codec. While the H.264 codec does use keyframes that contain the complete video image, intermediate frames contain data only related to changes in the video signal. With an unchanging video feed, the intermediate frames do not need to reflect any changes. By increasing the time between keyframes, even greater compression of the video track 310 is possible.

In the audio image file 300 shown in FIG. 3, the audio track contains two separate audio comments 322, 324. In FIG. 3, the first comment 322 to appear in the track 320 is actually the second to be recorded chronologically. This means that the audio track 320 of the audio image file 300 will start with the most recent comment 322. When a standard video player plays this audio image file 300, the most recently added comment will be played first. This could be advantageous if multiple comments 322, 324 have been added to the audio image file 300 and the recipient is only interested in hearing the most recently added comments 322, 324. Alternatively, the audio commentaries 322, 324 could be added to the audio image file 300 in standard chronological order so that the first comment recorded 324 will start the audio track 320. This allows a user who views the audio image file 300 with a standard video player to hear all the comments 324, 322 in the order in which they were recorded. This may be the preferred implementation, as later-recorded commentaries will likely respond to statements made in the earlier comments.

The metadata 330 that is included in the video file 300 provides information about these two audio commentaries 322, 324. Metadata 332 contains information about the first comment 322, including the name of the user who recorded the comment (Katy Smith), the data and time at which Ms.

Smith recorded this comment, and the time slice in the audio track 320 at which this comment 322 can be found. Similarly, metadata 334 provides the user name (Bob Smith), date and time of recording, and the time slice in the audio track 320 for the second user comment 324. The metadata 330 may also contain additional data about the audio image file 300, as the audio image file 300 is itself a video file and the video codec and the audio image app 132 that created this file 300 may have stored additional information about the file 300 in metadata 330.

In the preferred embodiment, the different comments 322, 324 are included in a single audio track 320 without chapter breaks. Chapter breaks are normally used to divide video files into logical breaks, like chapters in a book. The video playback facilities in some standard mobile device operating systems are not capable of displaying and managing chapter breaks, and similarly are not able to separately play different audio tracks in a video file, As a result, the audio image file 300 shown in FIG. 300 does not use separate chapters or separate audio tracks to differentiate between different user comments 322, 324. Rather, the metadata 330 is solely responsible for identifying the different comments 322, 324 in the audio track 320 of the file 300. In FIG. 3, this is done through the "time slice" data, which indicates the start and stop time (or start time and duration) of each comment in the track 320. In other embodiments, true video file chapter breaks (or even multiple tracks) could be used to differentiate between different audio comments 322, 324.

Figure 4:
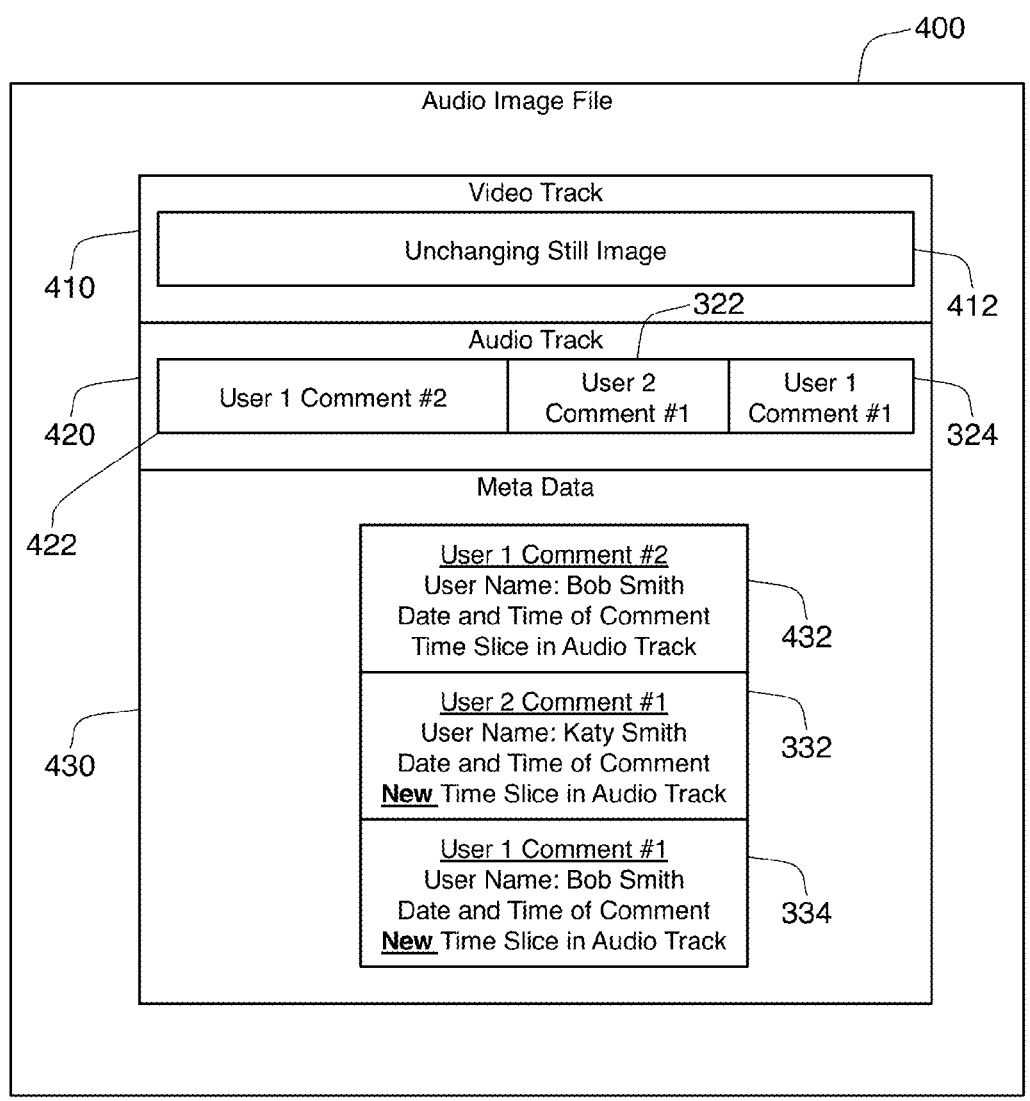
FIG. 4 is a schematic diagram showing the components of a new audio image file after an audio comment is added to the audio image file of FIG. 3.

FIG. 4 shows a new audio image file 400 that is created after a third comment 422 is added to the file 300 shown in FIG. 3. As was the case with file 300, this file 400 includes a video track 410, an audio track 420, and metadata 430. The audio track 420 includes a third comment 422 in addition to the two comments 322, 324 that were found in file 300. In FIG. 4, this new comment 422 appears at the beginning of the audio track 420, as this comment 422 is the most recent comment in this audio image file 400. Similarly, the metadata 430 includes metadata 432 concerning this new track 422, in addition to the metadata 332, 334 for the prior two tracks 322, 324, respectively. Note that the time slice location of the prior two tracks 322, 324 has changed in the new audio track 420. While track 322 originally appeared at the beginning of track 320, it now appears in track 420 after the whole of track 422. Consequently, the new location of audio comments 322, 324 must now be reflected in revised versions of metadata 332, 334, respectively. In the alternative embodiment where the commentaries are recorded in the audio track 420 in chronological order, the new commentary 422 would appear after commentary 324 and commentary 322 in the audio track 420. Furthermore, in this embodiment it would not be necessary to modify metadata 332 and 334 as the time locations for these commentaries 322, 324 in track 420 would not have changed with the addition of the new commentary 422. With both embodiments, the video track 410 will again include an unchanging still image 412, much like the video track 310 of file 300. The one difference is that this video track 410 must extend for the duration of all three comments 322, 324, and 422 in the audio track 420.

User Interfaces 510, 610

Figure 5:
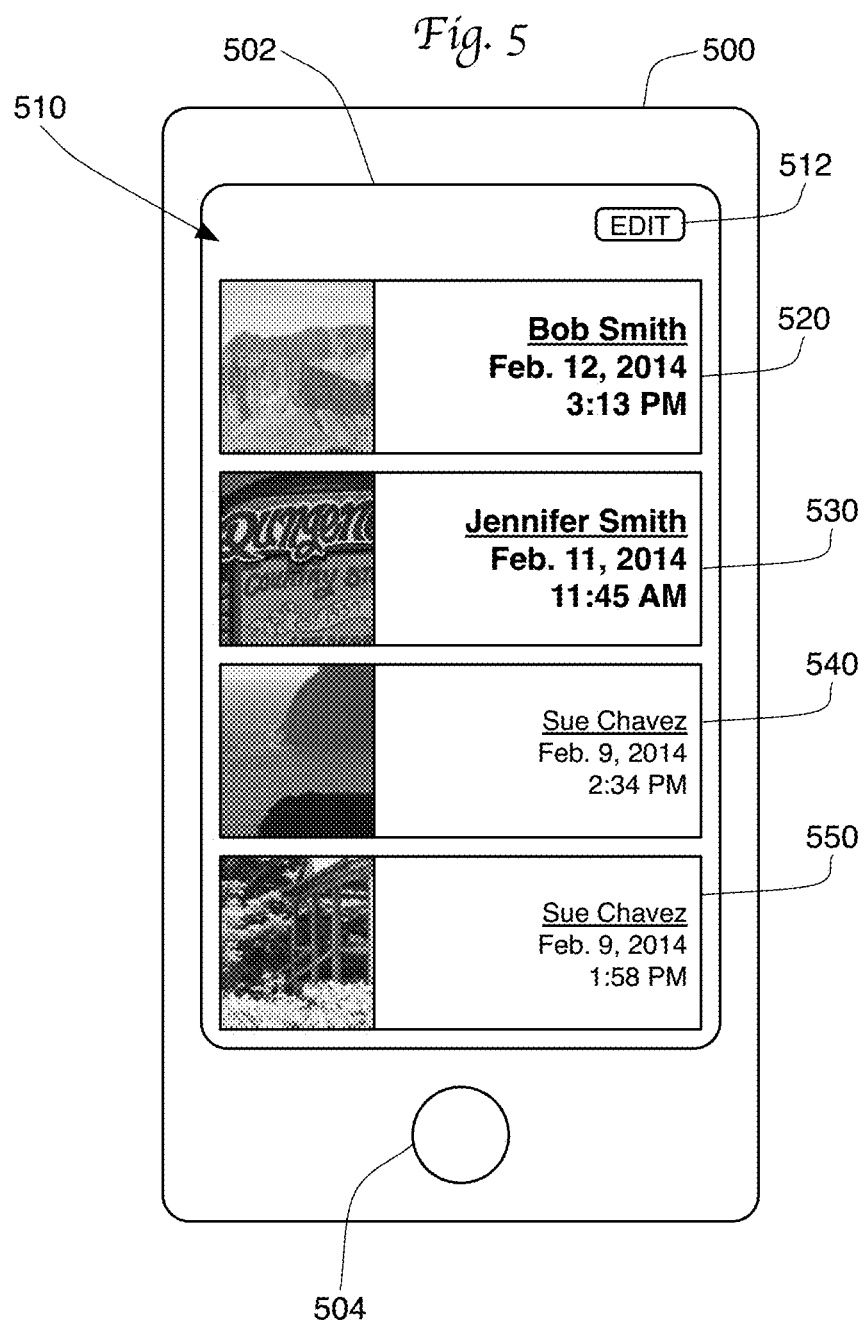
FIG. 5 is a plan view of a mobile device displaying a user interface provided by an app.

FIG. 5 shows a mobile device 500 that has a touch screen display 502 and a user input button 504 located below the display 502. In this Figure, the device 500 is presenting a user interface 510 created by the audio image app 132. This interface 510 shows a plurality of audio images 520-550 that have been received by the app 132 from the server 160. The audio images 520-550 are presented in a list form, with each item in the list showing a thumbnail graphic from the audio image and the name of an individual associated with the audio image 520-550. In some circumstances, the name listed in interface 510 is the name of the individual that last commented on the audio image 520-550. In other circumstances, the user who owns the mobile device 500 may have made the last comment. In these circumstances, the name listed may be the other party (or parties) who are participating in the audio commentary concerning the displayed image. The list in interface 510 also shows the date and time of the last comment added to each audio image. In FIG. 5, the first two audio images 520, 530 are emphasized (such as by using a larger and bold type font) to indicate to the user that these audio images 520, 530 have not yet been viewed. The interface 510 may also include an edit button 512 that allows the user to select audio images 520-550 for deletion.

In FIG. 5, the audio images 520-550 are presented in a queue in reverse chronological order, with the most recently received audio image 520 being presented at the top. In other embodiments, the audio images 520-550 are presented in a hierarchical in-box. At the top of the hierarchy are participants—the party or parties on the other side of a conversation with the user. After selection of a participant, the in-box presents audio images associated with that participant as the next level in the hierarchy. These audio images are preferably presented in reverse chronological order, but this could be altered to suit user preferences. After selection of an individual audio image, the in-box may then present the separate commentaries made in that audio image as the lowest level of the hierarchy. A user would then directly select a particular audio commentary for viewing in the app. Alternatively, the app could present the latest audio commentary to the user after the user selected a particular audio image without presenting the separate commentaries for individual selection.

Figure 6:
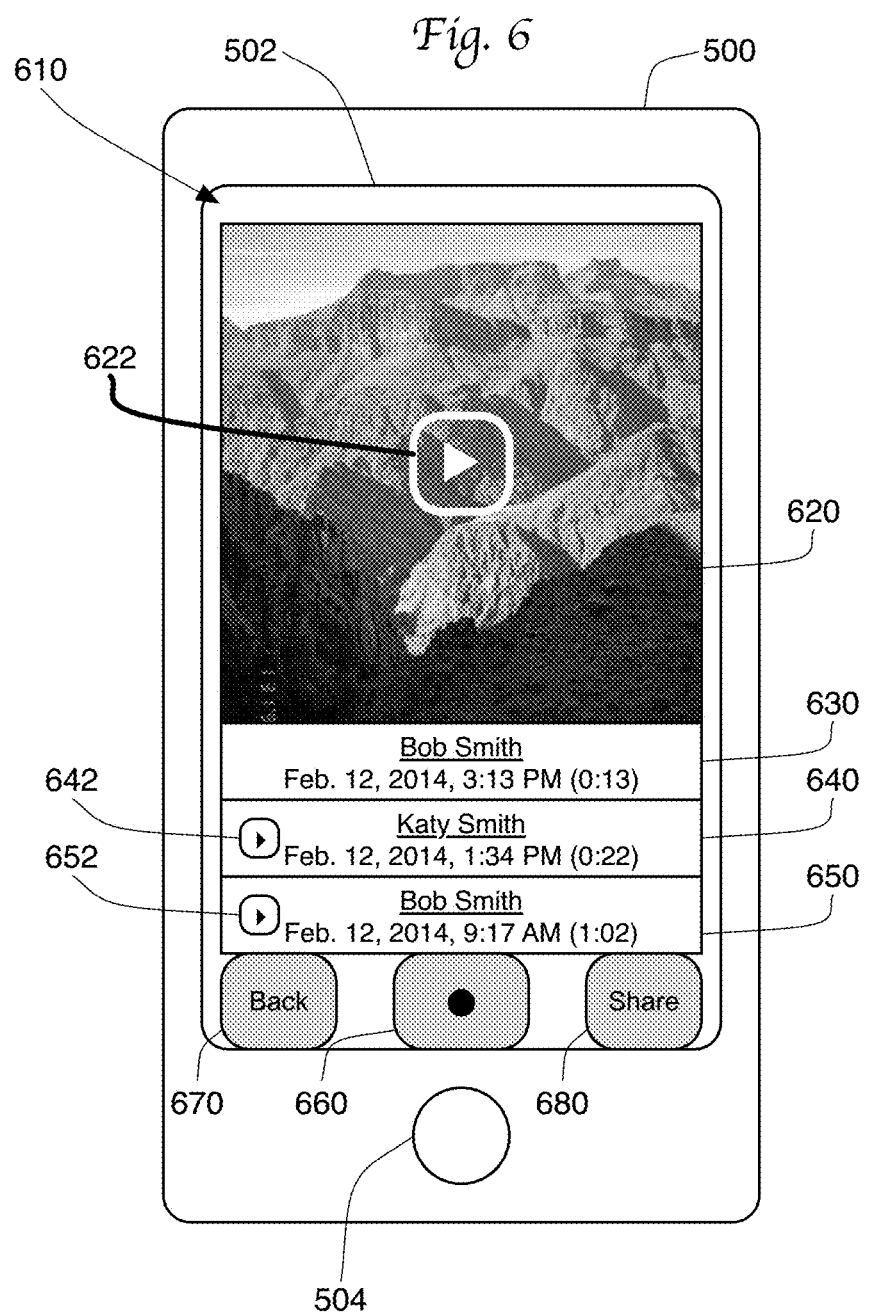
FIG. 6 is a plan view of the mobile device of FIG. 5 displaying a second user interface provided by the app.

If a user selects the first audio image 520 from interface 510, a new interface 610 is presented to the user, as shown in FIG. 6. This interface includes a larger version of the image 620 included in the audio image file. Superimposed on this image 620 is a play button 622, which, if pressed, will play the last audio commentary that has been added to his audio image. Below the image 620 is a list of the audio commentaries 630, 640, 650 that are included with the audio image. As seen in FIG. 6, the most recent audio commentary was created by Bob Smith on Feb. 12, 2014 at 3:13 PM, and has a duration of 0 minutes and 13 seconds. If the user selects the play button 622 (or anywhere else on the image 620), this audio commentary will be played. If the user wishes to select one of the earlier audio commentaries 640, 650 for playback, they can select the smaller playback buttons 642, 652, respectively. If more audio commentaries exist for an image 620 than can be simultaneously displayed on interface 610, a scrollable list is presented to the user.

In the preferred embodiment, the user interface 610 will remove the listings 630, 640, 650 from the display 502 when an audio commentary is being played. The image 620 will expand to cover the area of the display 502 that previously contained this list. This allows the user to focus only on the image 620 when hearing the selected audio commentary. When the user has finished listening to the audio commentary, they can press and hold the record button 660 on screen 502 to record their own response. In the preferred embodiment, the user holds the button 660 down throughout the entire audio recording process. When the button 660 is released, the audio recorded is paused. The button 660 could be pressed and held again to continue recording the user's audio commentary. When the button 660 is released, the user is presented with the ability to listen to their recording, re-record their audio commentary, delete their audio commentary, or send a new audio image that includes the newly recorded audio commentary to the sender (in this case Bob Smith) or to a third party. By pressing the back button 670, the user will return to interface 510. By pressing the share button 680 without recording a new commentary, the mobile device 500 will allow a user to share the selected audio commentary 520 as it was received by the device 500.

Methods 700, 800, 900

Figure 7:
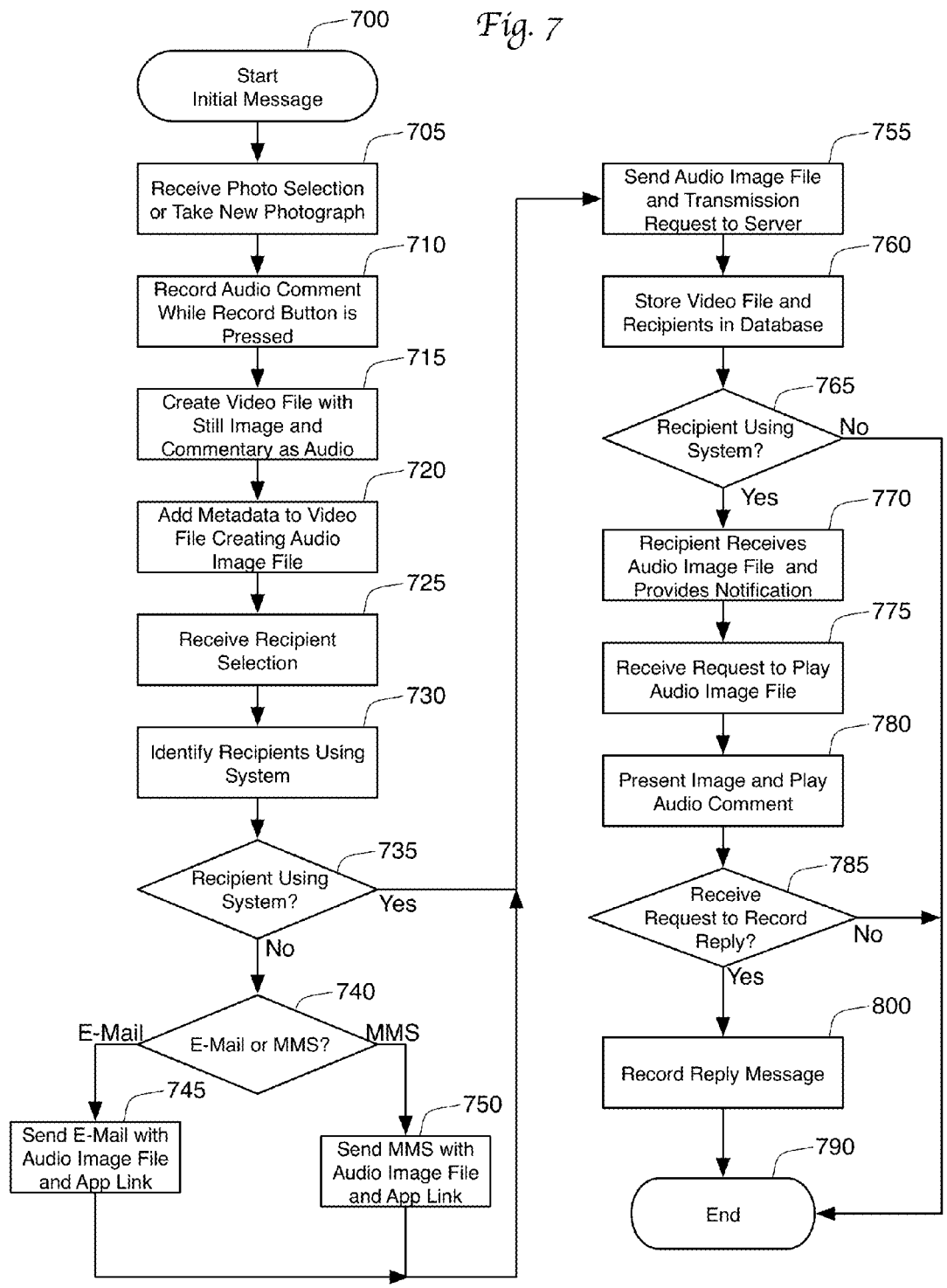
FIG. 7 is a flow chart showing a method of creating, transmitting, and responding to an audio image file.

The flowchart in FIG. 7 shows a method 700 for creating, sending, and playing an audio image file. This method 700 will be described from the point of view of the system 100 shown in FIG. 1. The method begins at step 705, when the originator of an audio image either selects an image from the existing photos 146 already on their mobile device 110, or creates a new image using camera 114. At step 710, the app 132 shows the selected image to the user and allows the user to record an audio commentary, such as by holding down a record button (similar to button 660) presented on the touch screen 116 of the mobile device 110. The app 132 will then use a video codec, such as may be provided by the mobile device operating system 140, to encode both the image and the audio commentary into a video file (step 715). The app 132 will also add metadata 330 to the video file to create an audio image file 300 at step 720. The metadata 330 provides sufficient information about the audio track 320 of the audio image file 300 to allow another device operating the app 132 to correctly play the recorded audio commentary.

Once the audio image file 300 is created, the app 132 will, at step 725, present a user interface to allow the originator to select a recipient (or multiple recipients) for this file 300. As explained above, the app 132 may present the user with their existing contact list 148 to make it easier to select a recipient. In some cases, a recipient may have multiple possible audio image addresses 260 at which they can receive the audio image file 300. For instance, a user may have two e-mail addresses 230 and two cellular telephone numbers 240. In these cases, the app 132 can either request that the originator select a single audio image address for the recipient, or the app can select a "best" address for that user. The best address can be based on a variety of criteria, including which address has previously been used to successfully send an audio image file to that recipient in the past.

Once the recipient is selected, the app 132 will determine at step 730 whether or not the recipient is a user of the app 132. As explained above, this can be accomplished by the app 132 sending a query to the audio image server 160 requesting a determination as to whether the audio image address for that recipient is associated with a known user of the app 132. If the recipient has multiple possible audio image addresses, the query may send all of these addresses to the server 160 for evaluation. If the recipient is not a known user of the app 132, this will be determined at step 735. Step 740 will then determine whether the selected or best audio image address is an e-mail address or a cell phone number. If it is an e-mail address, step 745 will create and send an e-mail 172 to the recipient. This e-mail 172 will include the audio image file 300 as an attachment to the e-mail. In addition, the e-mail will include a link to the download location 190 for the app 132 along with a message indicating that the app 132 is needed to create and send a reply to the audio image. If step 740 determines that the audio image address 260 is a cell phone number, then step 750 will create and send an MMS message 182 to the recipient. As was true of the e-mail 172, the MMS message 182 will include the audio image file as an attachment, and will include a link to download location 190 along with a message stating that the app 132 is necessary to create a reply to the audio image.

After sending an e-mail at step 745 or an MMS message at step 750, step 755 will also send the audio image file and relevant transmission information to the audio image server 160. This transmission information may include the time of the e-mail or MMS transmission, the time that the audio comment was generated, the name of the originator and the recipient, and the recipient's chosen audio image address. This information will then be stored in database 164 along with the audio image file itself (step 760). As shown in FIG. 7, these same steps 755, 760 will also occur if step 735 determined that the recipient was a user of the app 132, as the server 160 needs this information to complete the transmission to the recipient. In fact, since the server 160 always receives this information from the sending mobile device 110 regardless of the transmission type, it is possible to eliminate the separate query of step 730. In this alternative embodiment, the transmission of the information at step 755 would occur at step 730. The app 132 could then be informed if the recipient were not a user of the app 132, allowing steps 740-750 to proceed. If the app 132 on mobile device 110 instead received notification that the server 160 was able to transmit the information directly to the recipient, then no additional actions would be required on behalf of the sending mobile device 110.

Once the server 160 has received the transmission information at step 755 and stored this information in database 164 at step 760, step 765 considers whether the recipient is a user of the app 132. If not, the server 160 need not take any further action, as the sending mobile device 110 is responsible for sending the audio image file to the recipient. In this case, the method 700 will then end at step 790 (method 900 shown in FIG. 9 describes the receipt of an audio image file by a mobile device that does not use the app).

Assuming that the recipient is using the app 132, then the server 160 transmits the audio image file 300 to the recipient mobile device 168. The recipient device 168 receives the audio image file 300 at step 770, and then provides a notification to the user than the file 300 was received. The notification is preferably provided using the notification features built into the operating systems of most mobile devices 168. At step 775, the app 132 is launched and the user requests the app 132 to present the audio image file 300. At step 780, the image is then displayed on the screen and this audio commentary is played. At this time, the user may request to record a reply message. If step 785 determines that the user did not desire to record a reply, the method 700 ends at step 790. If a reply message is desired, then method 800 is performed.

Figure 8:
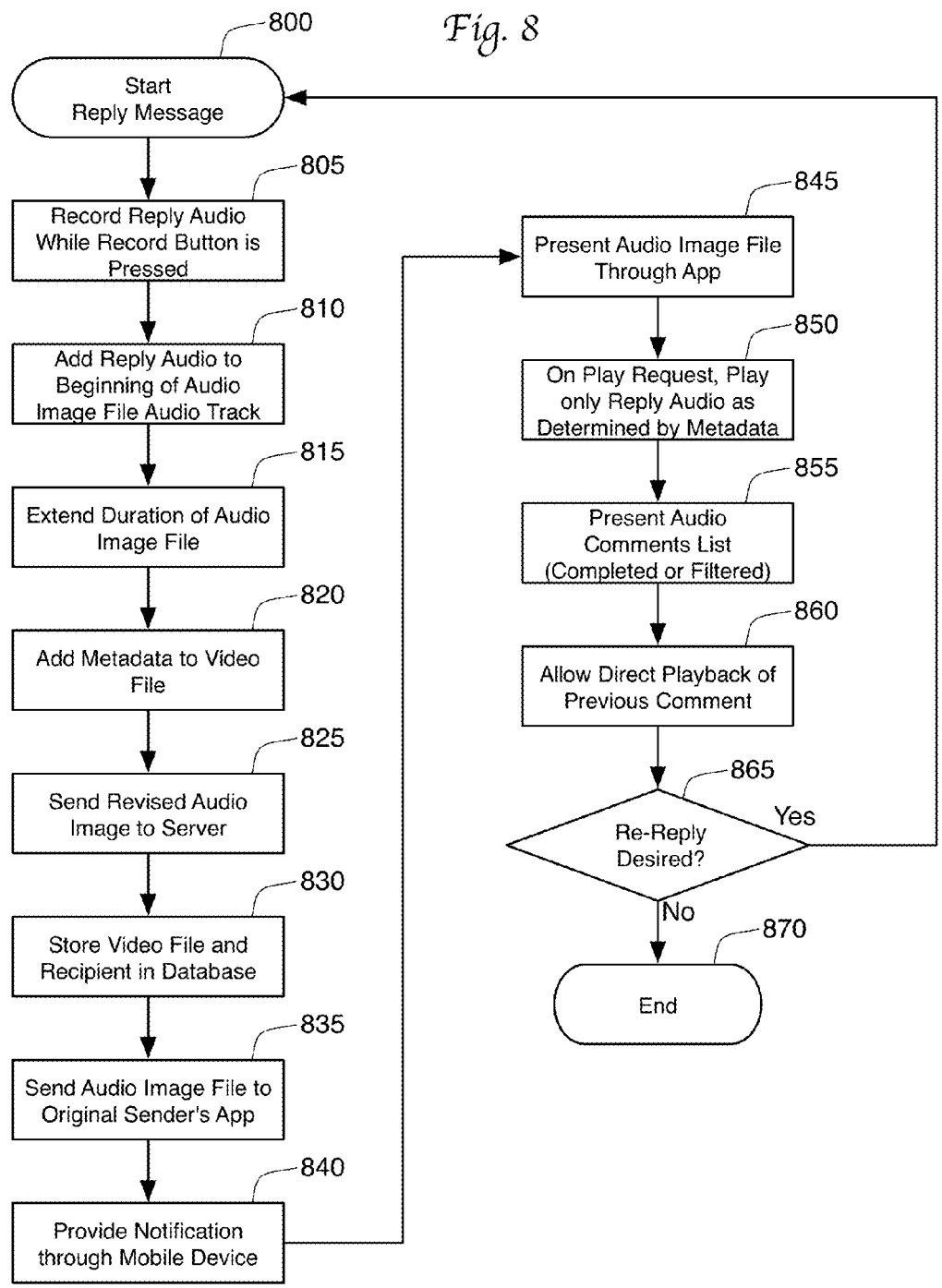
FIG. 8 is a flow chart showing the detailed steps of responding to an audio image file.

Method 800 is presented in the flow chart found in FIG. 8. The method starts at step 805 with the user of mobile device 168 indicating that they wish to record a reply. In the embodiments described above, this is accomplished by holding down a record button 660 during or after viewing the video image file 300. When the user lets go of the record button 660, the audio recording stops. At step 810, the audio recording is added to the beginning of the audio track 320 of the audio image file 300. With some audio codecs, the combining of two or more audio commentaries into a single audio track 320 can be accomplished by simply merging the two files without the need to re-compress the relevant audio. Other codecs may require other techniques, which are known to those who are of skill in the art. At step 815, the video track 310 is extended to cover the duration of all of the audio commentaries in the audio track 320. Finally, at step

820 metadata is added to the new audio image file. This metadata will name the reply commentator, and will include information about the time and duration of the new comment. This metadata must also reflect the new locations in the audio track for all pre-existing audio comments, as these comments might now appear later in the new audio image file.

At step 825, mobile device 168 sends the new audio image file to the server 160 for transmission to the originating device 110. Note that the transmission of a reply to the originating device 110 may be assumed by the app 132, but in most cases this assumption can be overcome by user input. For instance, the recipient using mobile device 168 may wish to record a commentary and then send the new audio image file to a mutual friend, or to both the originator and mutual friend. In this case, the workflow would transition to step 730 described above. For the purpose of describing method 800, it will be assumed that only a reply to the originating device 110 is desired.

The server will then store the new audio image file and the transmission information in its database 164 (step 830), and then transmit this new file to the originating mobile device 110 (step 835). App 132 will then notify the user through the touch screen interface 116 that a new audio image has been received at step 840. When the app 132 is opened, the app 132 might present all of the user's audio image files in a list, such as that described in connection with FIG. 5 (step 845). If the user request that the app 132 play the revised audio image file, the app 132 will display the original image and then play back the reply audio message at step 850. The metadata 330 in the file 300 will indicate when the reply message ends, allowing the app 132 to stop playback before that portion of the video file containing the original message is reached. As indicated at step 855, the app 132 can also present to the user a complete list of audio comments that are found in this audio image file 300, such as through interface 610 shown in FIG. 6.

In some cases, an audio image file may contain numerous comments. To assist with the management of comments, the app 132 can be designed to allow a user to filter the audio comments so that not all comments are displayed and presented on interface 610. For instance, a user may wish to only know about comments made by friends that are found in their contact records 148 or are made by the individual who sent the message to the user. In this instance, interface 610 would display only the comments that the user desired. The interface 610 may also provide a technique for the user to reveal the hidden comments. The user is allowed to select any of the displayed comments in the list for playback. The app 132 would then use the metadata 330 associated with that comment to play back only the relevant portion of the audio track 320 (step 860). The originator would also have the ability to create their own reply message at step 865. If such a re-reply is desired, the method 800 would start again. If not, the method 800 ends at step 870.

Figure 9:
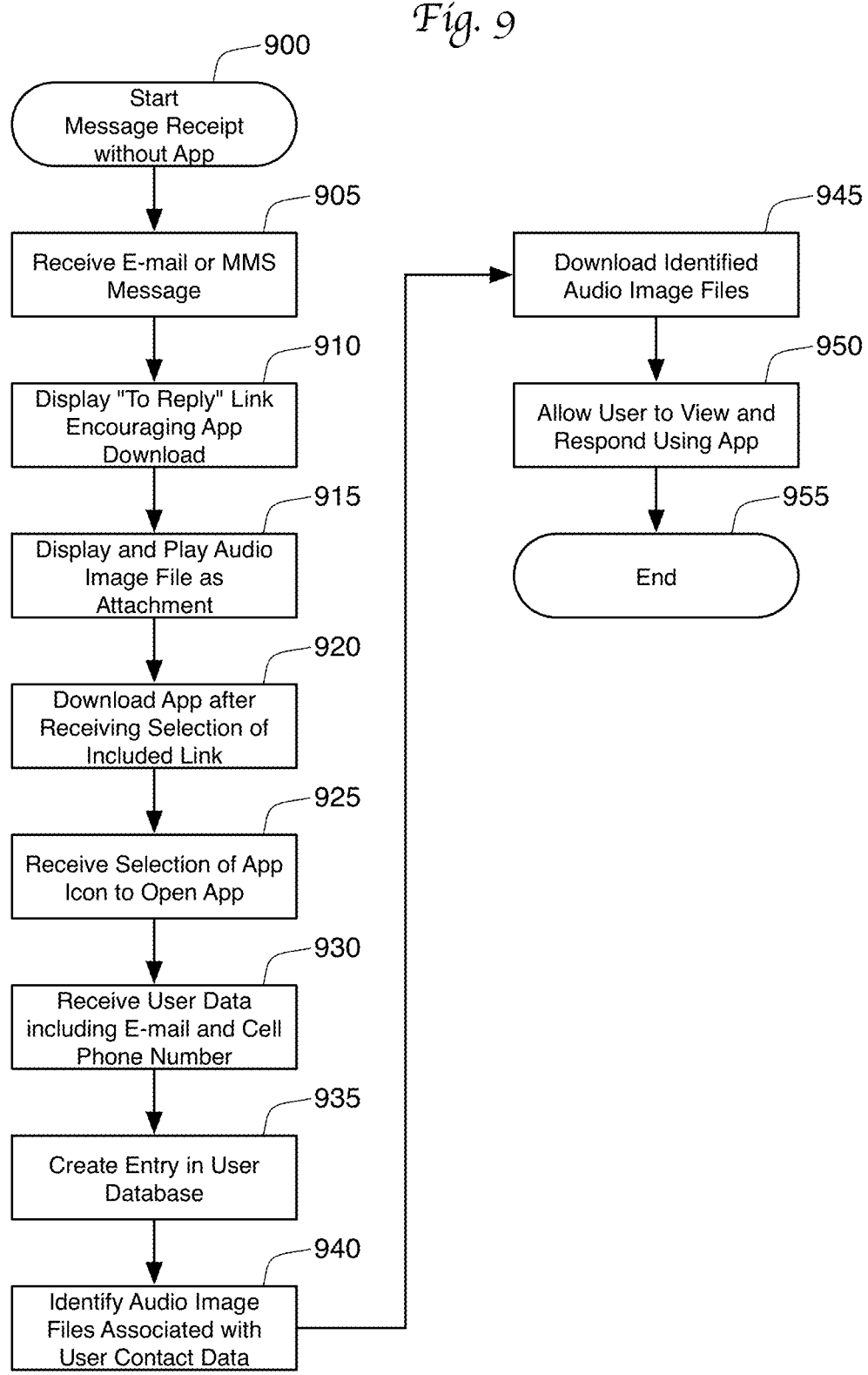
FIG. 9 is a flow chart showing the method of receiving an audio image file without the initial use of an app.

FIG. 9 displays a flow chart describing the method 900 by which a non-user of the app 132 is able to download the app 132 and see previously transmitted messages. The method 900 begins at step 905 when the user receives an e-mail or an MMS message containing an audio image file 300. When the e-mail or MMS message is opened, it will display a message indicating that the app 132 is required to create a reply (step 910). The message will also include a link to the app 132 at an app store 190, making the download of the app 132 as simple as possible.

Since the audio image file 300 that is sent in this context is a video file, the user can play the audio image file as a standard video file at step 915. This would allow the user to view the image and hear the audio commentaries made about the image. If more than one audio commentary were included in the audio image file 300, a standard video player would play through all of the commentaries without stopping. Whether the commentaries would play in chronological order or in reverse chronological order will depend completely on the order in which the commentaries were positioned in the audio track, as described above in connection with FIGS. 3 and 4. When a standard video player is used to play the audio image file 300, the user will not be able to add a new audio commentary to this file 300.

If the user wishes to create a new comment, they will select the provided link to app store 190. This selection will trigger the downloading of the app 132 at step 920. When the user initiates the app 132 by selecting the app's icon in the app selection screen of the operating system at step 925, the app 132 will request that the user enter personal information into the app. In particular, the app 132 will request that the user provide their name, their e-mail address(es), and their cell phone number(s). This information is received by the app 132 at step 930, and then transmitted to the server 160. The server 160 will then create a new user record 220 in the database 164, give that record 220 a new User ID 250, and then associate that user record 220 with the user provided e-mail addresses 230 and cell phone numbers 240 (step 935).

At step 940, the server 160 will search the database for audio image messages 200 that have been previously sent to one of the e-mail addresses 230 or cell phone numbers 240 associated with the new user record 220. All messages 200 so identified will be downloaded, along with the actual audio image file or data 210, to the user's app 132 at step 945. The user can then view the downloaded audio image files (such as through user interface 510 of FIG. 5), select one of the audio image files (as shown in FIG. 6), and then view the audio image file 300 through the app 132 (step 950). Step 950 will also allow the user to create reply audio messages through method 800, and transmit the resulting new audio image files to other users. The process 900 then terminates at step 955.

Deletion of Audio Image Files

As described above, the database 164 is designed to receive a copy of all audio image data files 300 that are transmitted using system 100. In addition, app 132 may store a copy of all audio image data files 300 that are transmitted or received at a mobile device 110. In the preferred embodiment, the app 132 is able to selectively delete local copies of the audio image data files 300, such as by using edit button 512 described above. To the extent that the same data is stored as database entity 210 in the database 164 managed by server 160, it is possible to allow an app 132 to undelete an audio image file 300 by simply re-downloading the file from the server 160. If this were allowed, the server might require the user to re-authenticate themselves, such as by providing a password, before allowing a download of a previously deleted audio image file.

In some embodiments, the server 160 will retain a copy of the audio image file 300 as data entity 210 only as long as necessary to ensure delivery of the audio image. If all recipients of an audio image file 300 were users of the app 132 and had successfully downloaded the audio image file 300, this embodiment would then delete the audio image data 210 from the database 164. Meta information about the audio image could still be maintained in database entity 200. This would allow the manager of server 160 to maintain information about all transmissions using system 100 while ensuring users that the actual messages are deleted after the transmission is complete. If some or all of the recipients are not users of the app 132, the server 160 will keep the audio image data 210 to allow later downloads when the recipients do become users of the app 132. The storage of these audio image files in database 164 can be time limited. For example, one embodiment may require deletion of all audio image data 210 within three months after the original transmission of the audio image file even if the recipient has not become a user of the app 132.

Alternatives to Single Images

Figure 10:
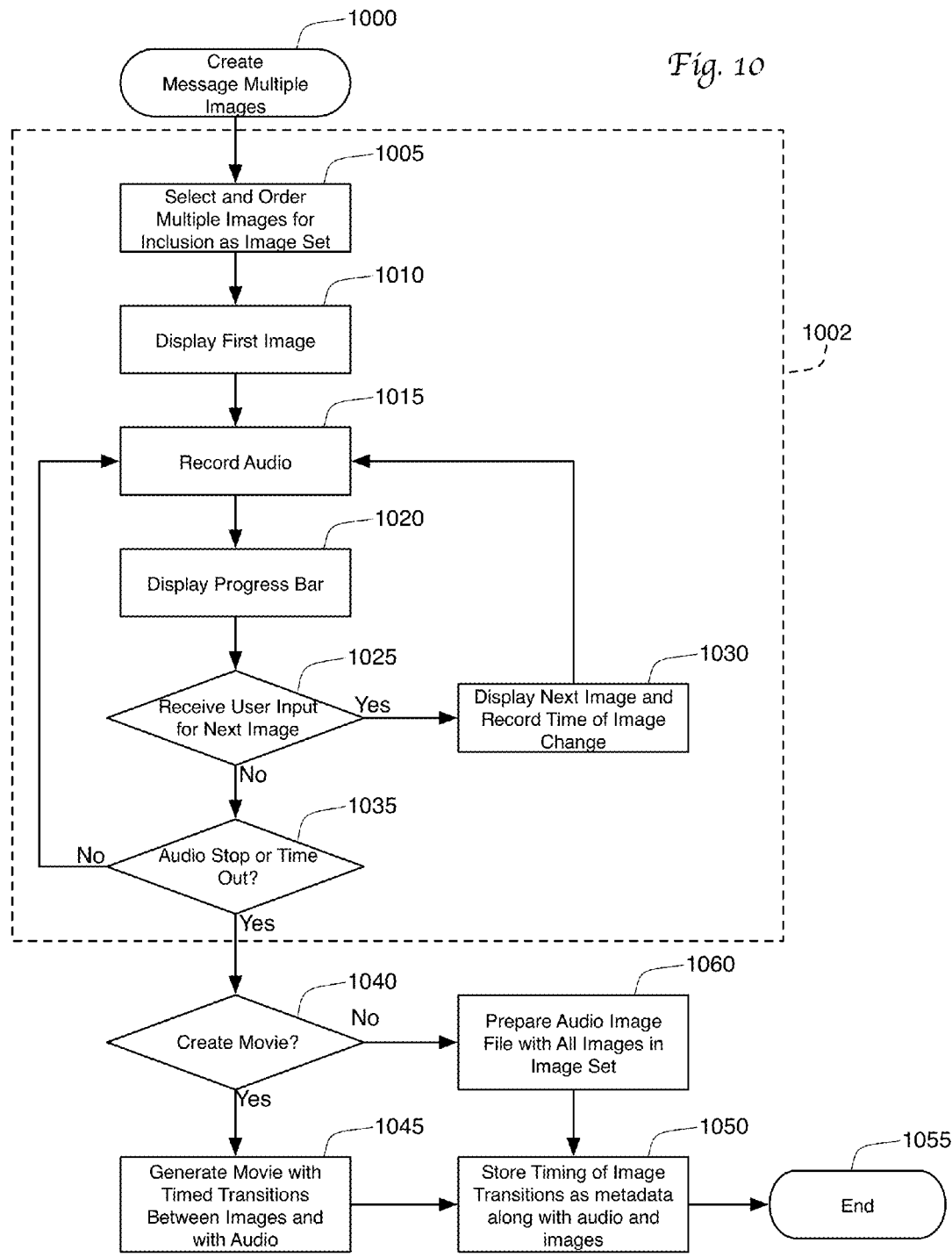
FIG. 10 is a flow chart showing a method of creating an audio-image file having multiple images.

In the above-described embodiments, audio-image files were created based around a single image. FIG. 10 describes a process 1000 in which multiple images can be combined into a single audio-image file. The process starts at step 1005, where the creator selects a plurality of still images for inclusion as an image set. As shown in FIG. 10, this step 1005 also requests that the user sort the selected images in the image set before recording an audio commentary for the image set. This pre-sorting allows a user to easily flip between the ordered images in the image set when creating an audio commentary. This sorting can be skipped, but then it would be necessary for the user to manually select the next image to be displayed while recording the audio commentary.

After the images in the image set are selected and ordered in step 1005, the app 132 will present the first image at step 1010. When the user is ready, the user will begin recording the audio commentary at step 1015, such as by pressing the record button 1040. In the preferred embodiment, no audio commentary in an audio-image file is allowed to exceed a preset time limit. This helps to control the size of the audio-image files, and encourages more, shorter-length interchanges between parties communicating via audio-image files. While such time limits could apply to all audio-image files, they are particular useful when multiple images are selected in method 1000 because of a user's tendency to provide too much commentary for each image in the image set. As a result, method 1000 includes step 1020, in which a progress bar is constantly displayed during creation of the audio commentary indicating to the user how much time is left before they reach the maximum time for their comments.

In addition to displaying the first image and the progress bar, the app 132 will preferably present to the user a clear method for advancing to the next image in the image set. This may take the form of a simple arrow superimposed over the image. When the user taps the arrow, that interaction will be viewed as a user input to advance to the next image at step 1025. This user input could also take the form of a simple swipe gesture, which is commonly used in mobile devices to advance to a next image or page in a document. When this input is received at step 1025, the next image will be displayed at step 1030. In addition, the app 132 will record the time during the audio commentary at which the next image was displayed. The method returns to step 1015, which allows the user to continue to record their audio commentary, and step 1020, which continues to display the progress bar. If no input for the next image is received at step 1025, the method 1000 proceeds to step 1035 to determine whether audio recording should stop. An audio recording will stop if the user indicates that he or she is done recording the audio (such as by pressing record button 1040), or if the maximum time for the audio recording is reached. If step 1035 does not stop the recording, the method simply returns to step 1015 to allow for additional audio recording and advancement to additional images.

As explained above, time-limits on a user's commentary can be helpful even when only a single image is being included in an audio-image file. As a result, the steps of including of a progress bar at step 1020 and a determination as to whether a maximum time is reached at step 1035 may be included in the other methods of creating an audio-image file described herein.

Figure 11:
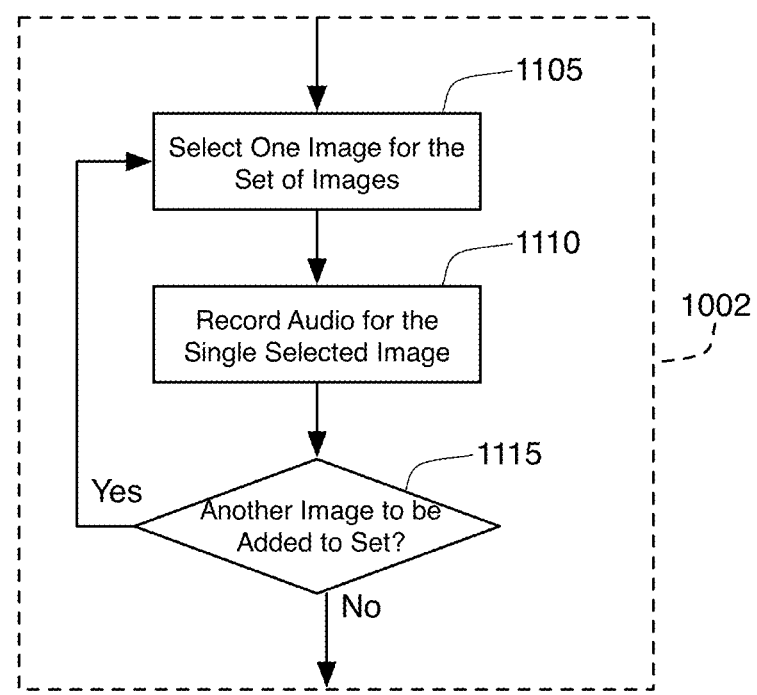
FIG. 11 is a portion of an alternative embodiment flowchart that replaces element 1002 in the flow chart of FIG. 10.

The steps described above for selecting multiple images and recording commentaries for those images have been grouped together as element 1002 in flow chart 1000. FIG. 11 presents an alternative embodiment, where steps 1105-1115 replace steps 1005-1035 in FIG. 10. In this alternative embodiment, the user selects a single image for the grouping of images that they intend to create (step 1105). The user then records an audio commentary for that single image in step 1110. Step 1110 can be performed in the same manner as described for the recording of audio commentaries elsewhere in this disclosure. The main distinction between step 1110 and step 1015 is that the audio commentary in step 1110 relates only to a single image, while the single audio commentary recorded through the looping of steps 1015-1030 relate to all of the images of the grouping. After the audio commentary for the single image is recorded in step 1110, step 1115 determines whether or not the user wishes to add another image to the image grouping. If so, step 1105 will then select the next image for the grouping and step 1110 will record a commentary for that next image. This loop will continue until all images have been selected and commentaries have been recorded for those images. In some embodiments, it would be possible to skip step 1110 for some images, allowing some images to be included in the image grouping without any commentary.

After selecting the images and recording the commentaries for those images through one of the alternatives for sub-process 1002, step 1040 determines whether a video track should be created that includes the transitions between the various images in the image set. As explained above, this type of video track is required if the recipient is not using the app 132, or if the app 132 is designed to display video tracks directly. This video track will time the transitions between the images to coincide with the audio commentary. This can be accomplished using the timings recorded at step 1030, or simply by determining the length of the commentaries recorded for each image in step 1110. If some images were included without commentaries in step 1110, the image can be included in the video for a set period of time (such as five seconds) without any audio commentary. Once the video track is created along with the audio track containing the audio commentary, step 1050 may store information about the individual images and transitions between the images in the metadata, and the process 1000 will end at step 1055. Of course, since the transitions and images are all embedded in the generated movie, it is possible that step 1050 could be skipped after the creation of the movie in step 1045.

As explained elsewhere herein, the receiving app 132 may use the included metadata to directly generate and display a received audio commentary rather than simply presenting a movie that was pre-generated by the sending device. If all of the recipients have access to such apps, step 1040 may elect to skip the movie generation step 1045. If so, step 1060 will create the audio image file with still images for each of the images in the image set. In effect, the audio image file constitutes a message or image grouping containing all of the individual images and their associated commentary. If a single audio track was created for all of the images pursuant to steps 1005-1035, transition information based on the times recorded at step 1030 will be included in the metadata stored with the file in step 1050. If separate audio commentaries were created for each of the images pursuant to steps 1105-1115, the metadata would associate each commentary with an image, and would associate the images together into an image or message grouping. This metadata would also specify the order in which the images in the image grouping should be presented. The message grouping is then transmitted to the recipient app. In one embodiment, this transmission occurs directly, with the message grouping being sent directly to the recipient mobile device. In other embodiments, the message grouping (the images, commentary, and associated metadata) is transmitted to the server (such as server 160), where it is associated with a message identifier. The message identifier is then sent to the recipient mobile device. The recipient device can then use this message identifier to request the message grouping from the server. In a third embodiment, the message grouping and destination are transmitted to the server. The server is then responsible for delivering the message grouping to the recipient. This can be accomplished by the server "pushing" the message to the recipient, or by waiting for the client app on the recipient device to request (or "pull") the message. When the recipient app receives this image grouping, it will use the metadata to determine the order of presentation of the various images, and will synchronize those images with the audio commentary. If the message grouping does not contain ordering metadata, the recipient app can simply present the images in the order in which they are stored in the grouping file.

In alternative embodiments, the receiving app will give the receiving user some control over the playback of the audio-image file. For instance, the recipient of an audio-image file containing a plurality of images may be given the ability to swipe between the various images, allowing the user to move back-and-forth between the images as desired. The audio commentary associated with each image could still be presented for each image when the image is displayed. Obviously, if the sender used the plurality of images to tell a single story via their audio commentary, the ability to control transitions and move backwards through the presented images would disrupt the continuity of the story. In these circumstances, the sender may restrict the ability of the recipient to control transitions between images through the transmitted metadata. Alternatively, the recipient may be required to review the entire audio commentary before being able to control transitions between the images. In these embodiments, the recipient app will automatically (without requiring user input) present all of the images and associated commentary to the user in a single presentation.

One disadvantage of using the movie recording created in step 1045 is that a reply commentary to the audio-image file will necessary need to either reply to a single static image (such as the last image in the image set), or reply to the entire image set using the transition timing of the original creator of the audio-image file. If the app presenting the audio-image file uses metadata rather than a video track to present the transitions between multiple images in the image set, the reply audio-commentary can be created using a new set of transitions between the images under the control of the reply commentator. This new transition metadata can be added to the audio-file metadata and used by the app when presenting the reply audio commentary. Because this is a significant benefit, the preferred embodiment of method 1000 will save the separate images and the transition metadata in step 1050 even when a movie containing the images and transitions are made in step 1045. In this way even a recipient without the app can first view the movie file created in step 1045, and then download the app, obtain a copy of the audio-image file with metadata from the server 160, and record a reply commentary with new transitions between the images.

Figure 12:
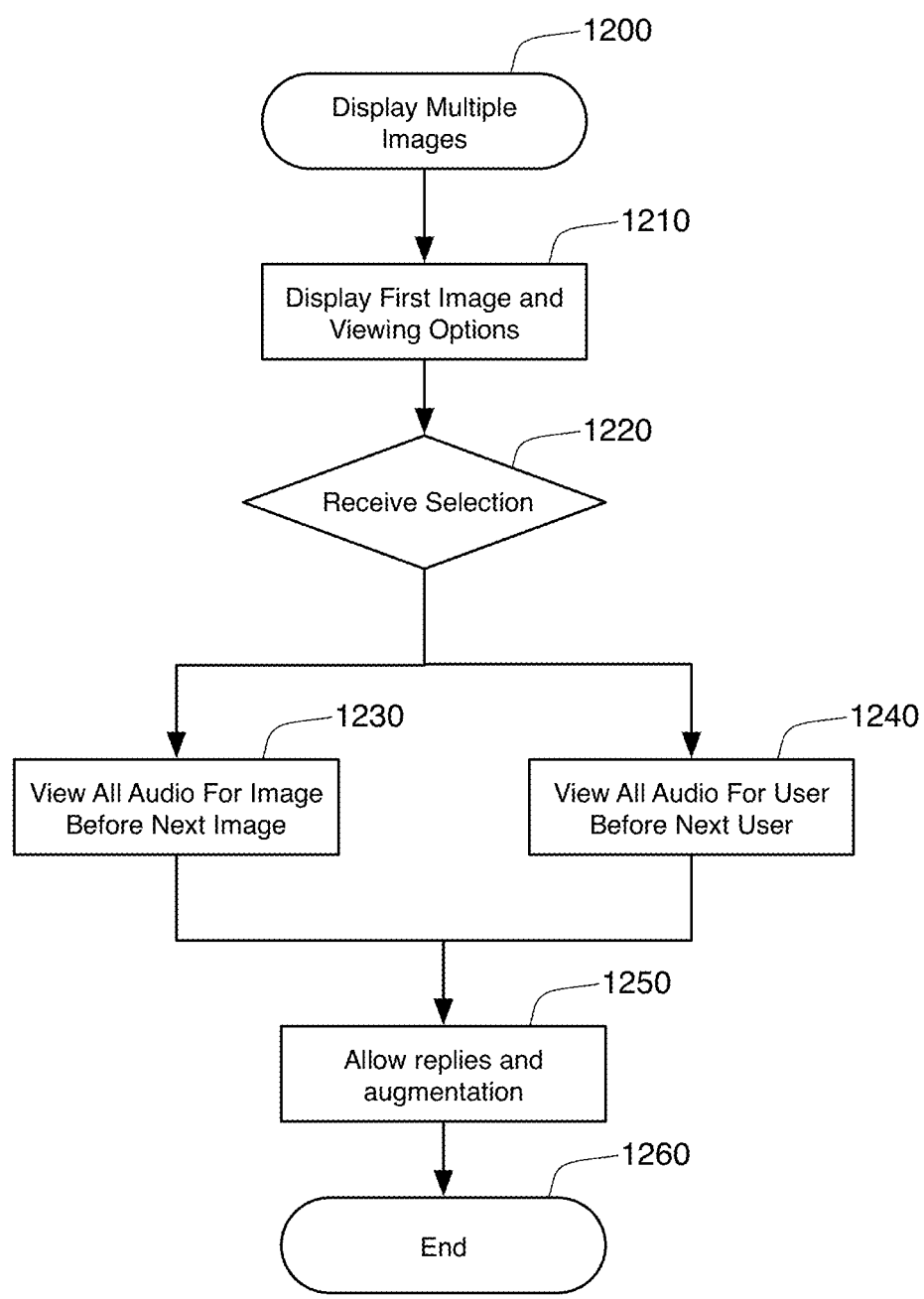
FIG. 12 is a flow chart showing a method for displaying a grouping of multiple images.

Of course, if the audio tracks are separately recorded for each image using the process of FIG. 11, this is not a problem. A recipient can simply record their commentaries for each image (or a selected subset of the images), and their reply commentaries would remain associated with that image during late playback. FIG. 12 shows one technique for presenting an image grouping that exemplifies this ability. FIG. 12 is best understood in the context of an example image grouping 1300 presented in FIG. 13. This image grouping 1300 contains three different images or videos, namely image 1 (1310), image 2 (1320), and video 1 (1330). According to FIG. 13, a first user commented on all three images/videos 1310, 1320, 1330. A second user received the message grouping and replied by commenting on only the first image 1310 and video 1330. After receiving this reply, the first user sent a second commentary back on the first image 1310. Note that commentaries on video clips can be obtained as described above and in the incorporated applications, and included in the audio image files created through any of the processes described in FIGS. 10 and 11.

Figure 13:
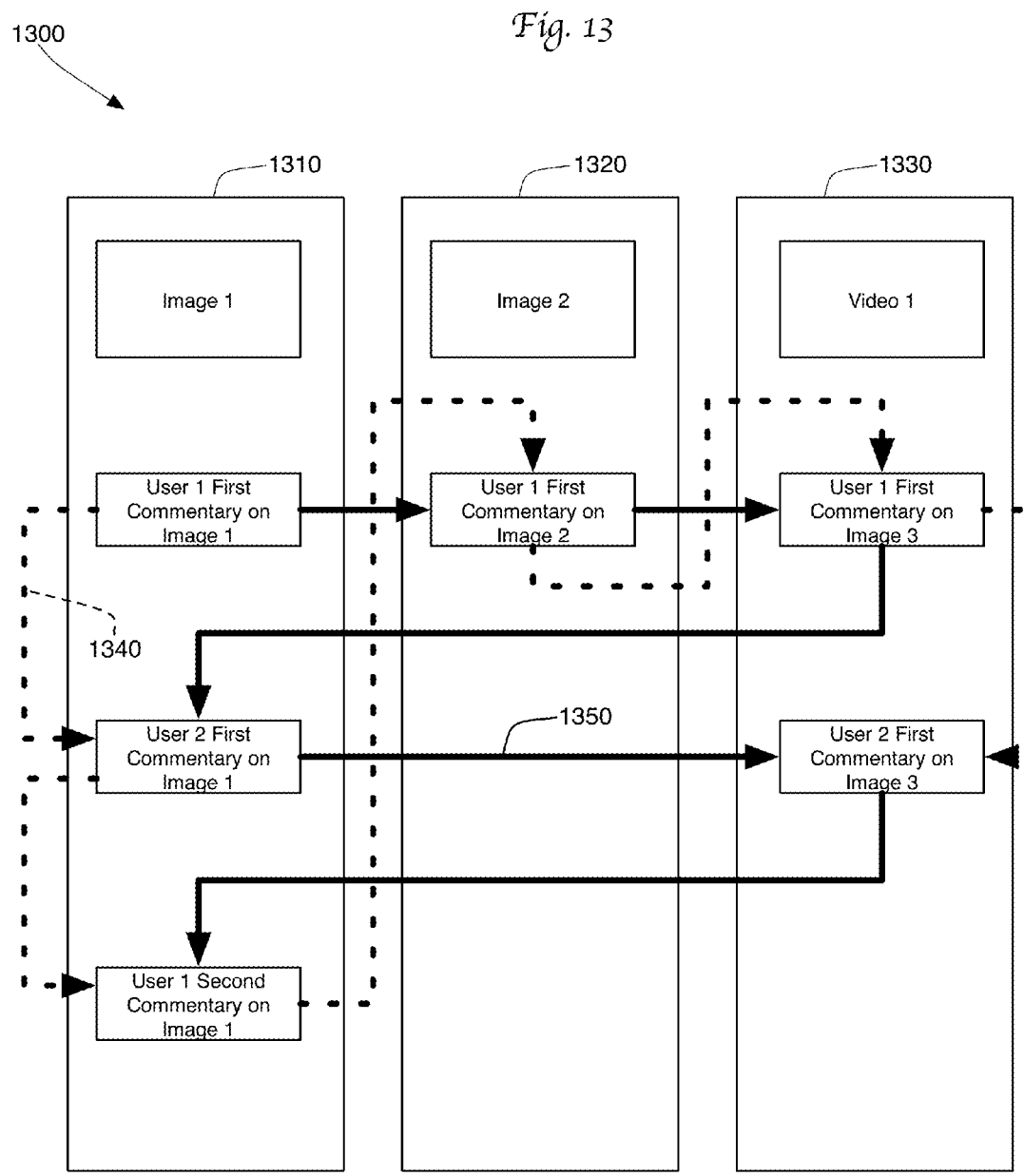
FIG. 13 is a schematic diagram showing two different orderings for the presentation of commentaries and images in a grouping of multiple images.

The method 1200 for presenting the commentaries in this product grouping 1300 is shown in FIG. 12. The method begins by displaying the first image and letting the user select between viewing/presentation options (step 1210). In one embodiment, the user may select between viewing/hearing the commentaries by image, or by user-session. The selection by the user is received in step 1220. If the user selects to review the commentaries by image, this means that the user will view (through step 1230) all audio commentaries for a first image 1310 in the image grouping 1300 before reviewing commentaries for the second image 1320. In FIG. 13, the order of presentation of the commentaries in this option is shown by dotted line 1340. The other option available for the user is to review all the audio for a user session for all images before reviewing the commentaries created in the next user session (step 1240). In FIG. 13, the ordering of presentation for this option is shown by the solid line 1350. With either option, the images associated with the commentaries will be displayed to the user while the audio commentaries are being played. Of course, other viewing options are possible, such as reviewing only commentaries from a particular user, or reviewing all commentaries made by a particular user before reviewing any commentaries made by another user. In addition, it is preferable to give users the option to manually pass through the images/video clips 1310, 1320, 1330 as desired, and to directly play any commentaries associated with a currently displayed image.

As explained above, images without audio commentaries can be displayed for a short period of time when no commentary is present. So if user 1 had not made any commentary on image 2 during her first commentary session, image 2 could still be displayed during review of the image grouping. This is true regardless of which option 1230, 1240 is selected. Once all the images in the grouping 1300 have been displayed, it is possible to skip uncommented-upon images during a second pass through the images and video clips (for instance, when following path 1350 through the image grouping 1300 while playing user 2's commentaries).

Once all of the commentaries are presented through steps 1230 or 1240, step 1250 allows a user to record reply messages for the individual images in the image grouping 1300. The user is also able to augment the images, as is further explained in the incorporated patent applications. The process 1200 then ends at step 1260.

Figure 14:
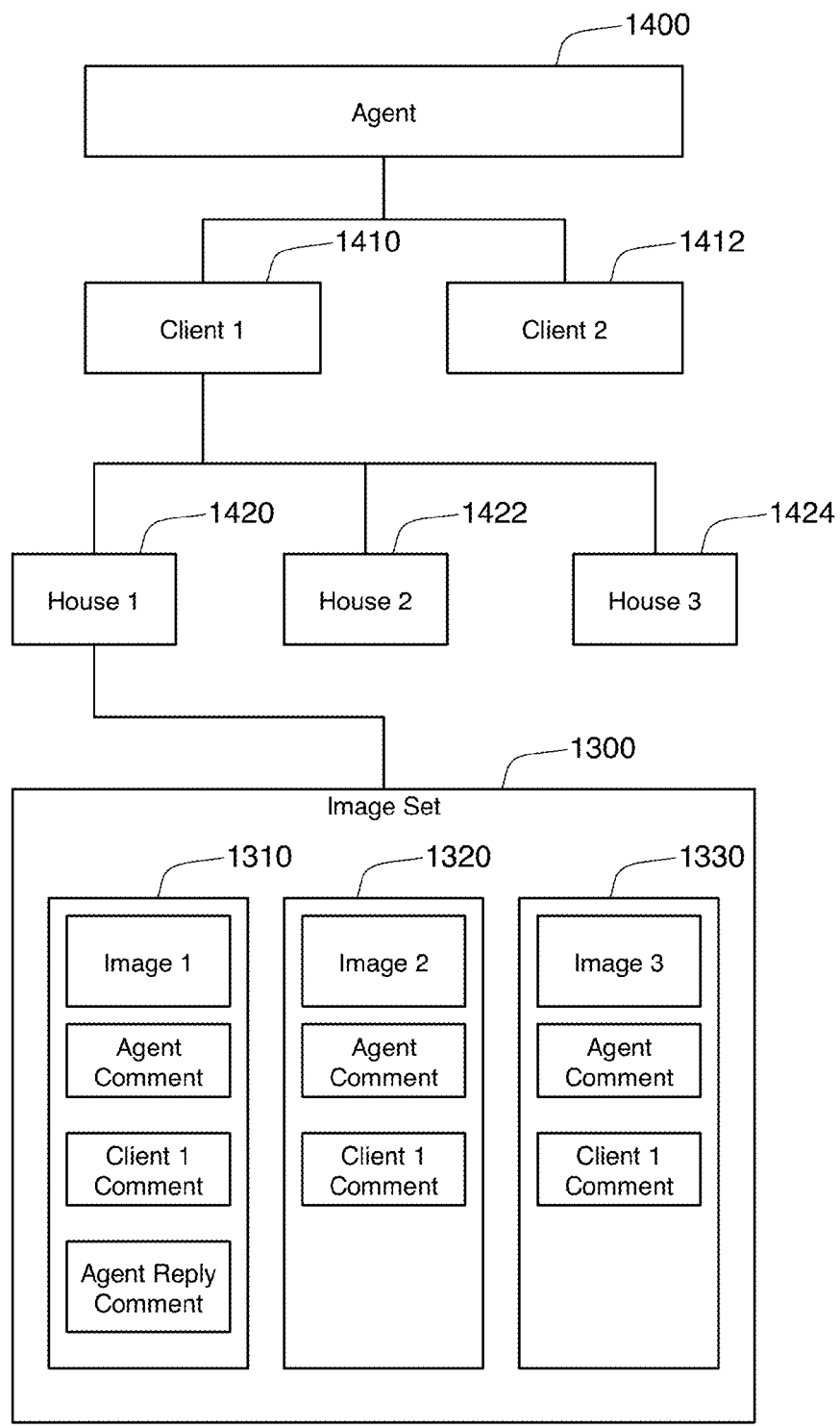
FIG. 14 is a schematic diagram showing the parties that could make use of the grouping of images in FIG. 13 in the context of a real estate home search.

FIG. 14 presents a sample use case for the image grouping 1300 and the methods of FIGS. 10-12. Here, a real estate agent 1400 is working with one or more clients 1410-1412. Client 1 (1410) is currently looking at three houses for purchase, namely house 1 (1420), house 2 (1422), and house 3 (1424). For each of the houses 1420-1424 that are being viewed by a client 1410-1412, the agent 1400 can generate and comment upon a set of photographs and videos taken at the house. In FIG. 14, the image set 1300 described above is represented as the image set created for house 1 (1420). In this way, the agent 1400 can "preview" a house for a client, take still images or videos of each of the rooms of the house, and include their own commentaries on each image/video clip. The client can review the image grouping 1300 and hear the agents comments, and then add their own commentary to some of the images/video clips. These reply comments can be sent back to the agent, and the agent can add their own response to these comments. New comments can be directly accessed using the methods and interfaces described above (such as those described in connection with FIG. 6).

The many features and advantages of the invention are apparent from the above description. Numerous modifications and variations will readily occur to those skilled in the art. Since such modifications are possible, the invention is not to be limited to the exact construction and operation illustrated and described. Rather, the present invention should be limited only by the following claims.

What is claimed is:

1. A computerized method comprising:
   a) at a first computing device, receiving a selection of a plurality of still images;
   b) at the first computing device, recording separate first audio commentaries for each of the plurality of still images through a microphone on the first computing device, wherein each first audio commentary is associated with a single one of the plurality of still images;
   c) at the first computing device, creating a first image grouping that associates the plurality of still images with the first audio commentaries;
   d) at the first computing device, transmitting the first image grouping to a server computer for storage at the server computer;
   e) at a second computing device, receiving the first image grouping from the server computer;
   f) at the second computing device, presenting, through a user interface on the second computing device, the plurality of still images and first audio commentaries that comprise the first image grouping;
   g) at the second computing device, recording second audio commentaries on at least a subset of the still images in the first image grouping, with each second audio commentary being associated with only one of the still images in the first image grouping;
   h) at the second computing device, creating a second image grouping combining the first image grouping with the second audio commentaries; and
   i) at the second computing device, transmitting the second image grouping to the server computer for storage at the server computer.

2. The computerized method of claim 1, wherein the first audio commentaries are associated with the plurality of still images through metadata found in the first image grouping.

3. The computerized method of claim 1, wherein the first image grouping is encoded into a video file, further wherein the first image grouping is transmitted to the second computing device in the form of the video file.

4. The computerized method of claim 1, wherein the step of presenting the plurality of still images and first audio commentaries at the second computing device comprises playing the first audio commentary for an associated still image on a speaker of the second computing device while presenting the associated still image on a display of the second computing device.

5. The computerized method of claim 1, wherein the first image grouping is stored at the server computer in association with a message identifier, and further wherein the message identifier is transmitted directly from the first computing device to the second computing device and is used by the second computing device to request the first image grouping from the server computer.

6. The computerized method of claim 5, wherein the second computing device transmits the message identifier to the server computer and receives the first image grouping from the server computer in response to transmitting the message identifier.

7. The computerized method of claim 1, further comprising:
   j) at a third computing device, presenting, through a user interface on the third computing device, the plurality of still images and audio commentaries that comprise the second image grouping.

8. The computerized method of claim 7, wherein the step of presenting the second image grouping on the user interface of the third computing device further comprises:
   i) displaying a single image in the second image grouping,
   ii) automatically playing the first and second audio commentaries within the second image grouping that are associated with that single image, and
   iii) after automatically playing the first and second audio commentaries within the second image grouping for that single image, displaying a second image in the second image grouping and automatically playing the first and second audio commentaries within the second image grouping that are associated with that second image.

9. The computerized method of claim 7, further comprising:
   l) at the third computing device, providing a user interface input allowing a user to choose between two presentation options, the presentation options comprising:
      i) playing all audio commentaries associated with a single image while displaying that single image before presenting the next image and its associated audio commentaries, and
      ii) first playing the first audio commentaries for all of the still images while displaying the still images associated with each of the first audio commentaries, and then playing the second audio commentaries for the still images while displaying the still images associated with each of the second audio commentaries;
   wherein the step of presenting the second image grouping at the third computing device conforms to the chosen presentation option.

10. The computerized method of claim 1, further comprising:
    j) at the server computer, transmitting the second image grouping to the first computing device; and
    k) at the first computing device, presenting, through a user interface on the first computing device, the plurality of still images and audio commentaries that comprise the second image grouping.

11. The computerized method of claim 10, further comprising:
- l) at the first computing device, providing a user interface input allowing a user to choose between two presentation options, the presentation options comprising:
  - i) playing all audio commentaries associated with a single image while displaying that single image before presenting the next image and its associated audio commentaries, and
  - ii) first playing the first audio commentaries for all of the still images while displaying the still images associated with each of the first audio commentaries, and then playing the second audio commentaries for the still images while displaying the still images associated with each of the second audio commentaries, and
- wherein the step of presenting the second image grouping at the first computing device conforms to the chosen presentation option.

12. A system comprising:
- a) a first computing device having
  - i) a microphone,
  - ii) a speaker,
  - iii) a display,
  - iv) a processor,
  - v) a network interface,
  - vi) non-transitory, physical memory containing app programming;
- b) the app programming comprising instructions that program the processor to:
  - i) select a plurality of still images,
  - ii) for each still image:
    - (1) present the still image on the display,
    - (2) while presenting the still image, record an audio commentary through the microphone,
  - iii) group the plurality of still images and audio commentaries into an image grouping,
  - iv) transmit the image grouping to a server computer over the network interface,
  - v) receive a revised image grouping with additional commentaries from the server computer, the revised image grouping being created by a second computing device in communication with the server computer,
  - vi) provide a user interface allowing a user to choose between two presentation options, the presentation options comprising:
    - (1) playing all audio commentaries associated with a single image while displaying that single image before presenting the next image and its associated audio commentaries, and
    - (2) first playing the first audio commentaries for all of the still images while displaying the still images associated with each of the first audio commentaries, and then playing the second audio commentaries for the still images while displaying the still images associated with each of the second audio commentaries, and
  - vii) present the revised image grouping over the display and the speaker according to the chosen presentation option.

13. The system of claim 12, further comprising:
- c) the server computer having:
  - i) a server processor,
  - ii) a server network interface, and
  - iii) non-transitory, physical memory containing server programming; and
- d) the server programming comprising instructions that program the server processor to:
  - i) receive the image grouping from the first computing device,
  - ii) store the image grouping for later retrieval, and
  - iii) transmit the image grouping to the second computing device.

* * * * *